United States Patent
Forbes et al.

(10) Patent No.: US 9,522,346 B2
(45) Date of Patent: Dec. 20, 2016

(54) SULFUR SEAL DEVICE

(71) Applicant: Controls Southeast, Inc., Pineville, NC (US)

(72) Inventors: Brandon W. Forbes, Fort Mill, SC (US); David R. Hornbaker, Charlotte, NC (US); Thomas C. Willingham, Weddington, NC (US); George A. Hearn, Charlotte, NC (US)

(73) Assignee: CONTROLS SOUTHEAST, INC., Pineville, NC (US)

( * ) Notice: Subject to any disclaimer, the term of this patent is extended or adjusted under 35 U.S.C. 154(b) by 173 days.

(21) Appl. No.: 13/848,995

(22) Filed: Mar. 22, 2013

(65) Prior Publication Data

US 2013/0247763 A1 Sep. 26, 2013

Related U.S. Application Data

(60) Provisional application No. 61/799,268, filed on Mar. 15, 2013, provisional application No. 61/726,598, filed on Nov. 15, 2012, provisional application No. 61/713,036, filed on Oct. 12, 2012, provisional application No. 61/699,164, filed on Sep. 10, 2012, provisional application No. 61/625,967, filed on Apr.

(Continued)

(51) Int. Cl.
*F16T 1/20* (2006.01)
*B01D 19/00* (2006.01)
*C01B 17/02* (2006.01)

(52) U.S. Cl.
CPC ......... *B01D 19/0063* (2013.01); *C01B 17/021* (2013.01)

(58) Field of Classification Search
CPC .............................. B01D 19/0063; F16K 31/22
USPC ............... 137/171, 172, 192, 409, 428, 432, 436,137/442, 101.27, 122, 163, 165, 177, 183, 187,137/194, 202, 433; 210/119, 122, 123, 125; 96/158, 168, 189; 422/168
See application file for complete search history.

(56) References Cited

U.S. PATENT DOCUMENTS 1,448,972 A    3/1923  Long
1,738,809 A *  12/1929 Walter .......................... 137/179

(Continued)

OTHER PUBLICATIONS

International Search Report and Written Opinion for International Patent Application No. PCT/US2013/033530 mailed Jun. 17, 2013.

(Continued)

*Primary Examiner* — Mary McManmon
*Assistant Examiner* — Reinaldo Sanchez-Medina
(74) *Attorney, Agent, or Firm* — Moore & Van Allen PLLC; Jeffrey R. Gray

(57) ABSTRACT

Embodiments of the invention are directed to a sulfur trap comprising an inlet, a first chamber, a divider, a second chamber, an outlet, and a float assembly. The float assembly may have many different configurations, but generally comprises a float and plug, is configured to float within liquid sulfur, and is operatively coupled to a seal seat in the divider for sealing and unsealing the first chamber from the second chamber. Generally, only liquid sulfur is allowed to pass from the first chamber into the second chamber. However, the sulfur trap may be configured to allow for pressure relief, such that during an overpressure event the plug and seal seat disengage and allow the liquid-gas mixture to flow into the second chamber to prevent damage within the system. In some embodiments a filter and/or the flow of liquid sulfur is directed to collect debris from the liquid sulfur.

9 Claims, 27 Drawing Sheets

Related U.S. Application Data 18, 2012, provisional application No. 61/614,290, filed on Mar. 22, 2012.

(56) References Cited

U.S. PATENT DOCUMENTS

| | | | |
|---|---|---|---|
| 1,899,988 A | | 3/1933 | Ruemelin |
| 2,208,466 A | * | 7/1940 | Lopez .................... B01D 45/14 96/158 |
| 2,311,697 A | * | 2/1943 | Samiran ............. B01D 17/0214 137/172 |
| 2,849,079 A | | 4/1958 | Evans |
| 3,592,122 A | | 7/1971 | Hughes |
| 4,035,158 A | | 7/1977 | Scott et al. |
| 4,085,199 A | | 4/1978 | Singleton et al. |
| 4,117,100 A | | 9/1978 | Hellmer et al. |
| 4,132,238 A | | 1/1979 | Clark |
| 4,136,009 A | * | 1/1979 | Samiran ............. B01D 17/0214 210/114 |
| 4,185,140 A | | 1/1980 | Strella et al. |
| 4,255,408 A | | 3/1981 | Sims |
| 4,341,753 A | | 7/1982 | Mori et al. |
| 4,391,791 A | | 7/1983 | Palm et al. |
| 4,504,459 A | | 3/1985 | Stothers |
| 5,185,140 A | | 2/1993 | Kvasnikoff et al. |
| 5,498,270 A | | 3/1996 | Smith |
| 5,692,389 A | * | 12/1997 | Lord .......................... F25B 5/02 62/218 |
| 6,368,498 B1 | | 4/2002 | Guilmette |
| 6,471,756 B1 | * | 10/2002 | Satoh .............................. 96/165 |
| 7,112,308 B2 | | 9/2006 | Smith |
| 7,174,912 B2 | * | 2/2007 | Lowe ............................ 137/434 |
| 7,976,701 B2 | * | 7/2011 | Nishimoto et al. ........... 210/119 |
| 8,376,088 B2 | * | 2/2013 | Rollins et al. ............. 184/103.1 |
| 8,522,811 B2 | * | 9/2013 | Yang ............................ 137/194 |
| 2004/0069352 A1 | * | 4/2004 | Wieland ................ F16K 15/063 137/539 |
| 2004/0197622 A1 | | 10/2004 | Wheat et al. |
| 2005/0011362 A1 | | 1/2005 | Smith |

OTHER PUBLICATIONS

International Preliminary Report on Patentability for International Patent Application No. PCT/US2013/033530 mailed Feb. 11, 2014.

* cited by examiner

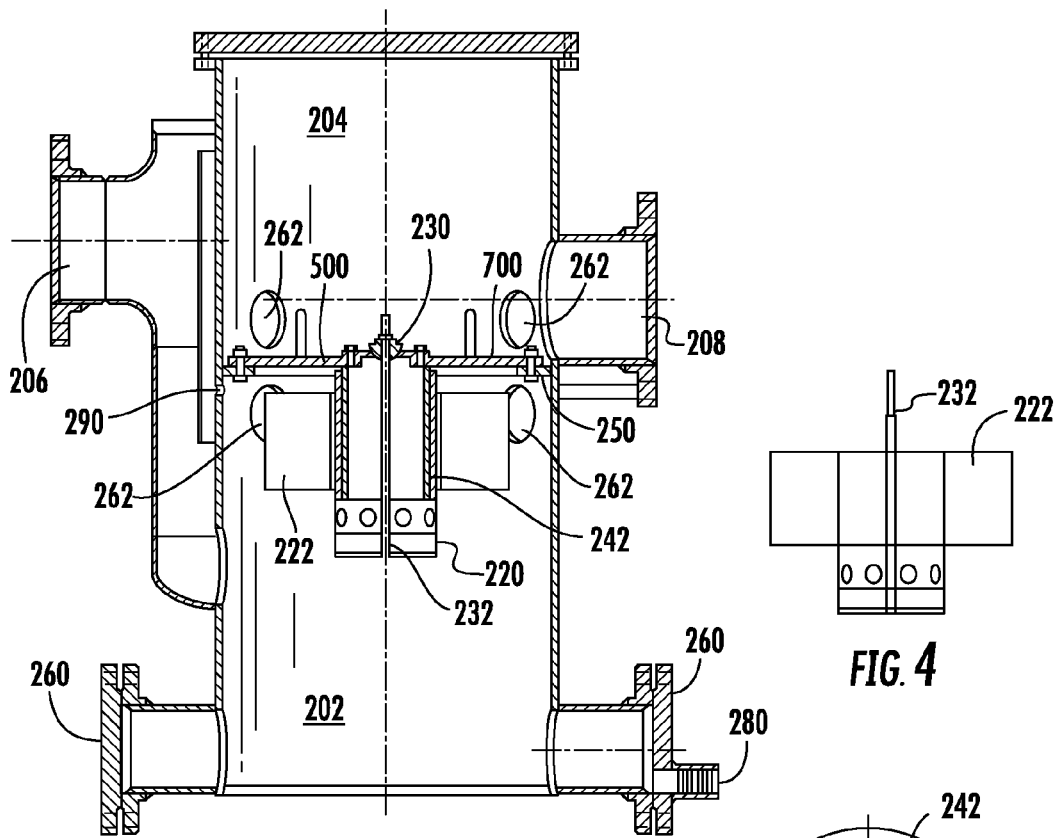
FIG. 2
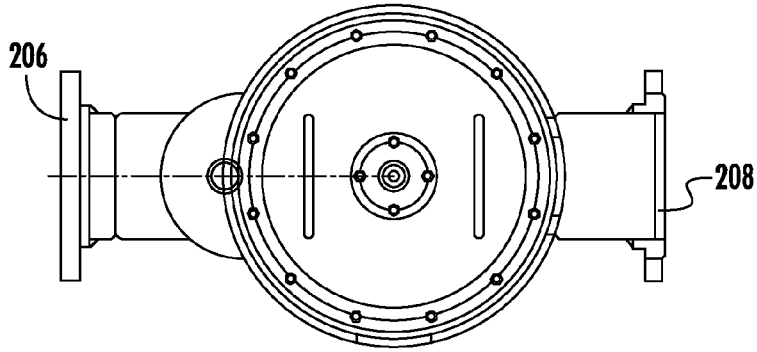
FIG. 3
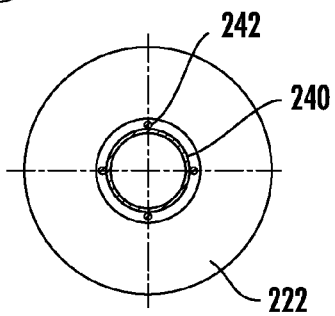
FIG. 4
FIG. 5A
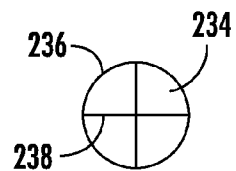
FIG. 5B

SULFUR SEAL DEVICE

CLAIM OF PRIORITY UNDER 35 U.S.C §119

The present Application for a Patent claims priority to six Provisional Applications having the following numbers: 61/614,290 filed on Mar. 22, 2012; 61/625,967 filed on Apr. 18, 2012; 61/699,164 filed on Sep. 10, 2012; 61/713,036 filed on Oct. 12, 2012; 61/726,598 filed on Nov. 15, 2012; and 61/799,268 filed on Mar. 15, 2013, all of which are entitled "Sulfur Seal Device," and all of which are assigned to the assignee hereof and hereby expressly incorporated by reference herein.

BACKGROUND OF THE INVENTION $H_2S$ is produced as a by-product from refining crude oil and other industrial processes. Sulfur recovery units are used in a variety of industrial applications to decompose the $H_2S$ into liquid sulfur and water. The decomposition process of $H_2S$ occurs via both thermal and catalytic reactions in a multi-step process, such as the modified Claus process. The resulting elemental sulfur is in the vapor phase and must be condensed to liquid. Since the decomposition process is equilibrium-limited, $H_2S$, sulfur, and other compounds co-exist in the condenser after processing. Once the sulfur condenses into liquid form, the remaining gases are typically referred to as tail gases and are largely composed of $H_2S$ but may contain carbonyl sulfide, carbon disulfide, and the like.

Sulfur recovery units typically utilize sulfur traps to separate liquid sulfur from the tail gases. The purpose of the sulfur trap is to allow the liquid sulfur to flow downstream from the condenser to a collection tank/pit/vessel while preventing the tail gases from also flowing to the collection tank/pit/vessel.

One such commonly used sulfur trap is a seal leg. Seal legs require piping to be extended downward into the earth, in some cases, twenty feet or more. In this way, maintaining the seal leg and removing the seal leg to clean out debris has proven to be difficult and dangerous. Other commonly used sulfur traps require individuals to regularly inspect, maintain, and clean the sulfur trap, thus exposing the individual to potentially harmful gases. Furthermore, precisely monitoring the liquid sulfur passing through the sulfur trap has proved to be difficult.

Therefore, there is a need for sulfur traps that solves these and other issues associated with the current types of sulfur traps.

SUMMARY OF THE INVENTION

Embodiments of the invention are directed to systems and methods of utilizing a sulfur trap that separates liquid sulfur from the tail gases. The sulfur trap may otherwise be referred to as a sulfur seal, or sulfur sealing, device, system, or apparatus. The sulfur trap receives liquid sulfur and tail gases, in the form of a liquid-gas mixture from an upstream condenser. Different embodiments of the invention provide different sulfur trap configurations that may utilize an upward flow configuration, or a downward flow configuration with improved pressure relief abilities and debris filtration.

The sulfur trap herein generally comprises an inlet, a first chamber (e.g., inlet chamber, ballast chamber, or receiving chamber), a second chamber (e.g., outlet chamber, seal chamber, or exit chamber), an outlet, a float assembly (e.g., insert assembly and a ballast assembly), and/or other components described herein. The float assembly may have many different configurations, but generally comprises a float (e.g., ballast) and plug, is configured to float within liquid sulfur, and is operatively coupled to a seal seat for sealing and unsealing a first chamber from a second chamber. The coupling of the float assembly and the sealing seat may have many different configurations, but is generally configured to allow only liquid sulfur to pass from the first chamber into the second chamber. For example, as the liquid-gas sulfur mixture enters the inlet chamber, it raises the float, which in turn causes to a coupling member to break the seal between a plug and the seal seat. As the liquid drains out of the first chamber and into the second chamber the float is lowered, and thus, when the level of liquid sulfur falls, the plug and seal seat engage to again prevent liquid sulfur from entering the second chamber. In some embodiments, the sulfur trap is configured to allow for a pressure relief, such that during an overpressure event in one embodiment the plug and seal seat disengage and allow the liquid-gas mixture to exit the sulfur trap in order to prevent an over pressurization situation that may damage the sulfur trap, liquid-gas supply lines, condenser, or other hardware located upstream of the sulfur trap.

In some embodiments of the invention the sulfur trap has drains and access ports that allow a user to access the components of the sulfur trap for cleaning, replacement, or repair. In some embodiments the sulfur trap may comprise viewing ports that allow a user to view the inside of the sulfur trap as the sulfur trap is operating in order to determine if the components are functioning properly to separate the liquid and gas from the liquid-gas mixture of sulfur. Various embodiments of the sulfur trap, sealing system, or sealing device are discussed in further detail below.

One embodiment of the invention is a sulfur seal apparatus comprising a first chamber for receiving a liquid sulfur and a tail gas mixture, a second chamber located at least partially above the first chamber, a divider for separating the first chamber from the second chamber, and a float assembly comprising a float. The float assembly is located at least partially within the first chamber and is operatively coupled to the divider to seal and unseal the first chamber from the second chamber. The liquid sulfur is allowed to flow upwardly into the second chamber and the tail gases remain in the first chamber when the float assembly and divider are unsealed while the float is buoyant within the liquid sulfur. The liquid sulfur and tail gases are prevented from entering the second chamber when the float assembly and divider are sealed while the float lacks buoyancy in the liquid sulfur. The float assembly is sized to unseal from the divider when the first chamber is subject to an overpressure event.

In further accord with an embodiment of the sulfur seal apparatus, the float assembly comprises a plug at least partially located within the second chamber, a plug connecting member operatively coupled to the float and the plug, and the float is located completely within the first chamber.

In another embodiment of the invention, the sulfur seal apparatus further comprises a sealing member comprising a seal seat. The sealing member is operatively coupled to the divider, and the seal seat and the plug are operatively coupled to seal and unseal the first chamber from the second chamber.

In yet another embodiment of the invention, the plug comprises a hemispherical surface and the seal seat comprises a conical surface.

In still another embodiment of the invention, the sulfur seal apparatus further comprises one or more access ports that allow for access for cleaning, replacement, or repair, and one or move viewing ports.

In further accord with an embodiment of the invention, the sulfur seal apparatus further comprises a drain to allow drainage of the liquid sulfur before accessing the apparatus.

In another embodiment of the invention, the sulfur seal apparatus further comprises an inlet operatively coupled to the first chamber, an outlet operatively coupled to the second chamber, and a vapor equalizer operatively coupled between the first chamber and the inlet configured for equalizing the pressure between the first chamber and the inlet.

In yet another embodiment of the invention, the sulfur seal apparatus further comprises an outlet channel operatively coupled to the divider within the first chamber, and float guides operatively coupled to the outlet channel. The outlet channel is at least partially submerged within the liquid sulfur, and the float moves with respect to the float guides and the outlet channel.

Another embodiment of the invention is a sulfur seal apparatus comprising a first chamber for receiving a liquid sulfur and a tail gas mixture, a second chamber located at least partially within or below the first chamber, a divider for separating the first chamber from the second chamber, and a float assembly comprising a float. The float assembly is located at least partially within the first chamber and operatively coupled to the divider to seal and unseal the first chamber from the second chamber. The liquid sulfur is allowed to flow downwardly into the second chamber and the tail gas remains in the first chamber when the float assembly and divider are unsealed while the float is buoyant within the liquid sulfur. The liquid sulfur and the tail gas are prevented from entering the second chamber when the float assembly and divider are sealed while the float lacks buoyancy in the liquid sulfur.

In another embodiment of the invention the sulfur seal apparatus further comprises a debris separator located at least partially within the first chamber for filtering debris from the liquid sulfur. The debris separator is secured within the apparatus by protrusions in a wall of the apparatus and a top of the apparatus.

In yet another embodiment of the invention, the float comprises a cylindrical float with a flat float top.

In still another embodiment of the invention, the sulfur seal apparatus further comprise a debris separator located at least partially within the first chamber, and one or more guides. The debris separator is configured for preventing the float from moving vertically past the one or more guides, and the flat float top distributes loading over an area of the float when contact is made with the debris separator.

In further accord with an embodiment of the sulfur seal apparatus, the float assembly comprises a plug operatively coupled to the float, and one or more guides located around the float. The one or more guides contact the float at single point locations around the float to guide a centerline of the plug into a centerline of an orifice in a seal seat of the divider to maintain proper alignment to seal and unseal the first chamber from the second chamber.

In another embodiment of the sulfur seal apparatus, the float assembly comprises a plug operatively coupled to the float and at least partially located within the first chamber, wherein the plug comprises a hemispherical surface; and a seal seat operatively coupled to the divider, wherein the seal seat comprises a conical surface. The seal seat and the plug are operatively coupled to seal and unseal the first chamber from the second chamber.

In yet another embodiment of the invention, the sulfur seal apparatus further comprises a sealing member comprising a seal seat. The sealing member is operatively coupled to the divider.

In still another embodiment of the invention, the sulfur seal apparatus further comprises one or more access ports that allow for access for cleaning, replacement, or repair, and one or move viewing ports.

In further accord with an embodiment of the invention, the sulfur seal apparatus further comprises a drain to allow drainage of the liquid sulfur before accessing the apparatus.

In another embodiment of the invention, the sulfur seal apparatus further comprises an inlet operatively coupled to the first chamber, and an outlet operatively coupled to the second chamber.

In still another embodiment of the invention, the sulfur seal apparatus further comprises a receiving chamber located adjacent the first chamber for receiving the liquid sulfur and the tail gas mixture, and a first chamber floor. The liquid sulfur is directed downwardly to the first chamber floor, and thereafter the liquid sulfur flows upwardly into the first chamber from the receiving chamber.

Another embodiment of the is a sulfur seal apparatus comprising a receiving chamber for receiving a liquid sulfur and a tail gas mixture, wherein the liquid sulfur is directed downwardly to a first chamber floor. The sulfur seal apparatus further comprises a first chamber, with the first chamber floor, located adjacent the receiving chamber for receiving the liquid sulfur and the tail gas mixture, wherein the liquid sulfur flows upwardly into the first chamber from the receiving chamber. The sulfur seal apparatus further comprises a second chamber located at least partially within or below the first chamber, a divider for separating the first chamber from the second chamber, and a float assembly comprising a float. The float assembly is located at least partially within the first chamber and is operatively coupled to the divider to seal and unseal the first chamber from the second chamber. The liquid sulfur is allowed to flow downwardly into the second chamber and the tail gases remain in the first chamber when the float assembly and divider are unsealed while the float is buoyant within the liquid sulfur. The liquid sulfur and tail gases are prevented from entering the second chamber when the float assembly and divider are sealed while the float lacks buoyancy in the liquid sulfur.

To the accomplishment of the foregoing and the related ends, the one or more embodiments of the invention comprise the features hereinafter fully described and particularly pointed out in the claims. The following description and the drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
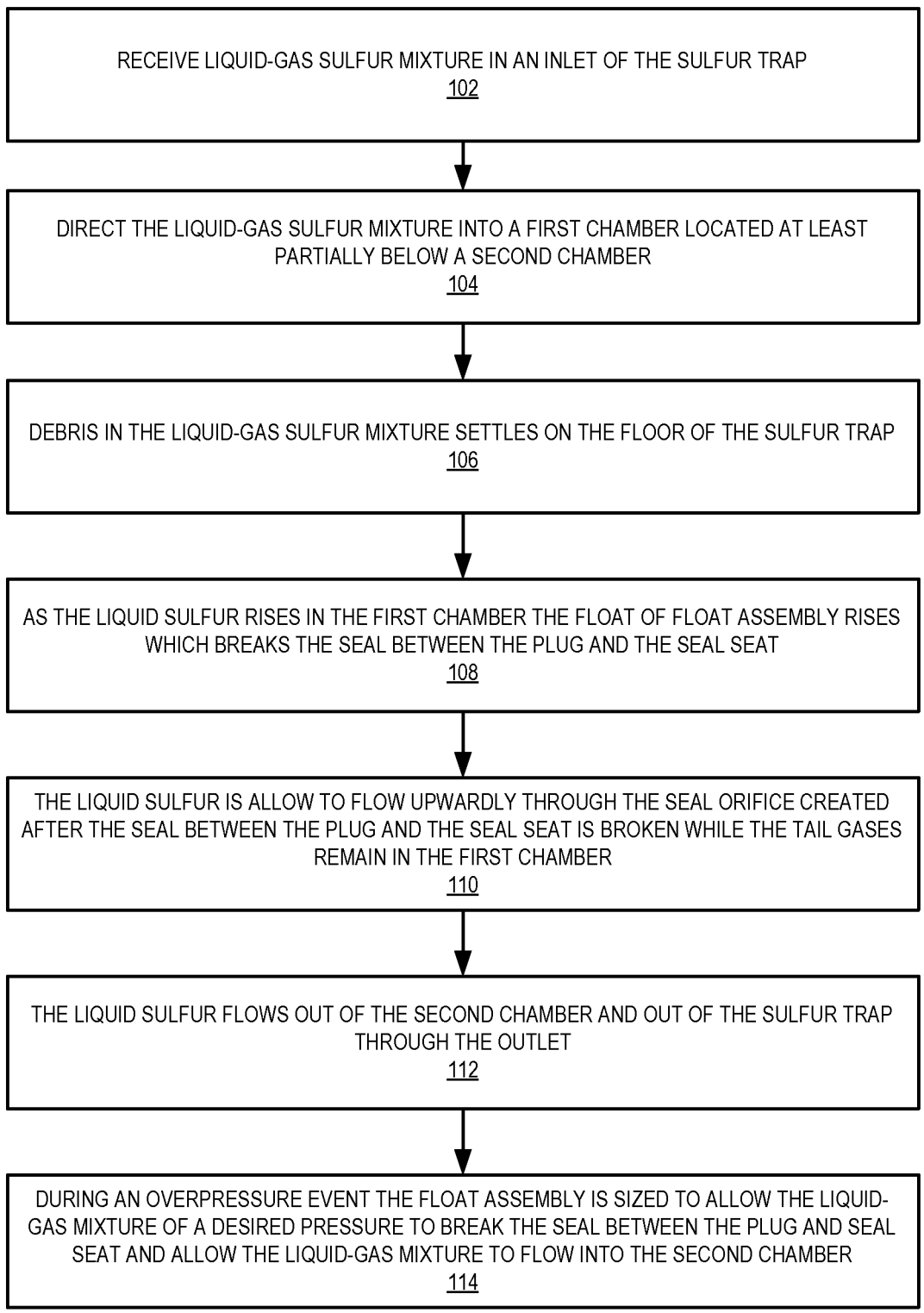
Figures 6, 7:
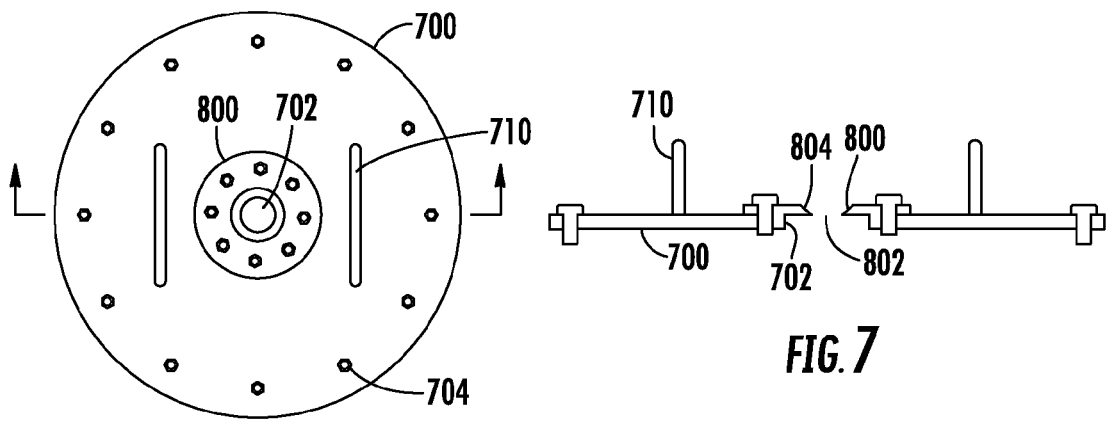
Figures 8, 9:
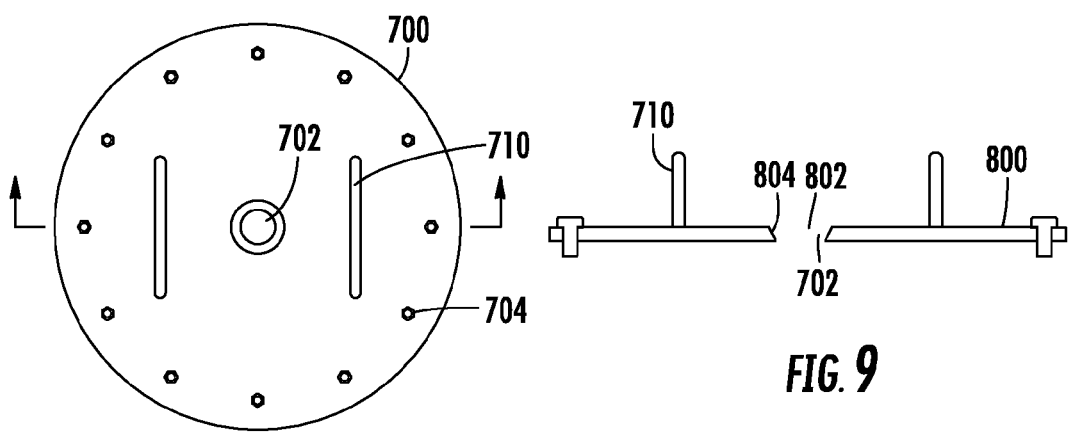
Figures 10, 11:
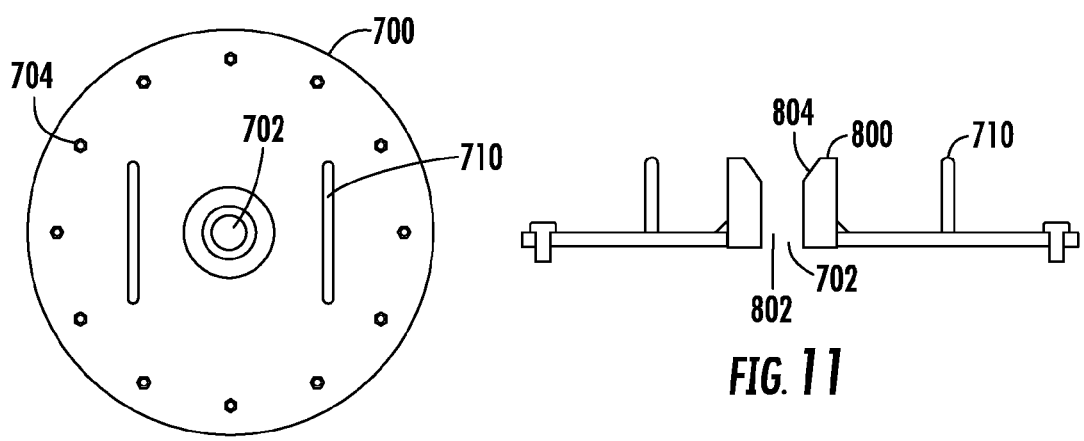
Figure 13:
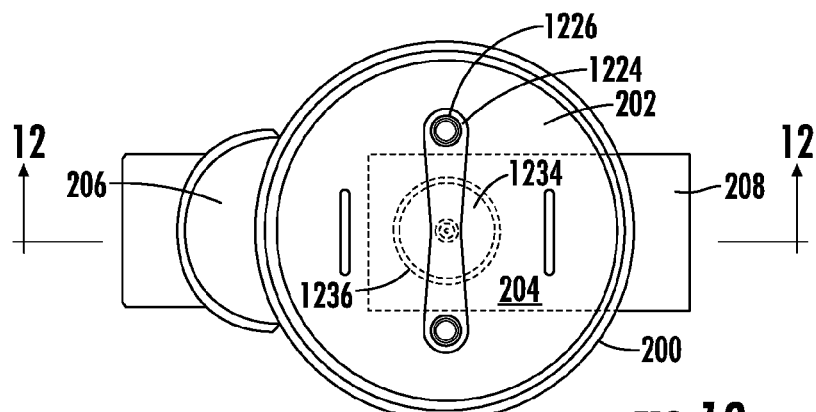
Figure 12:
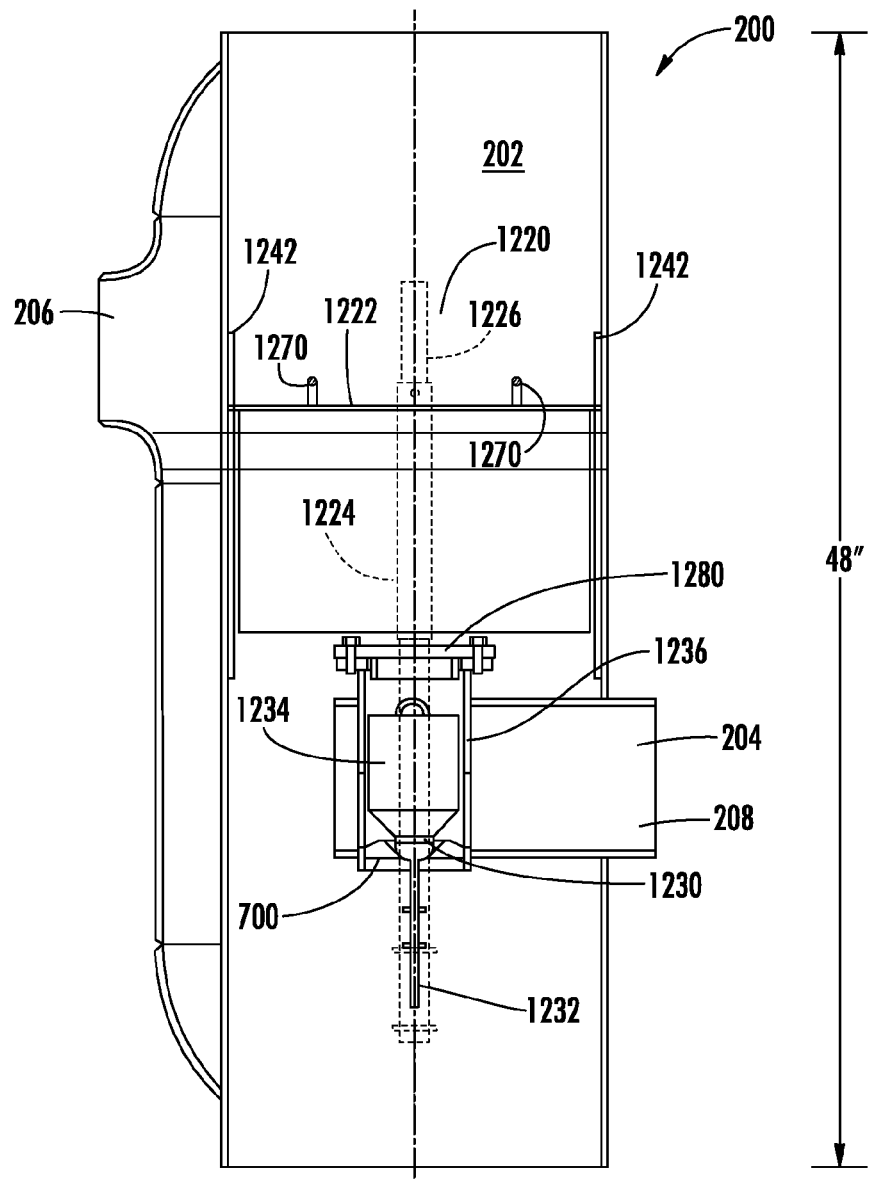
Figure 14:
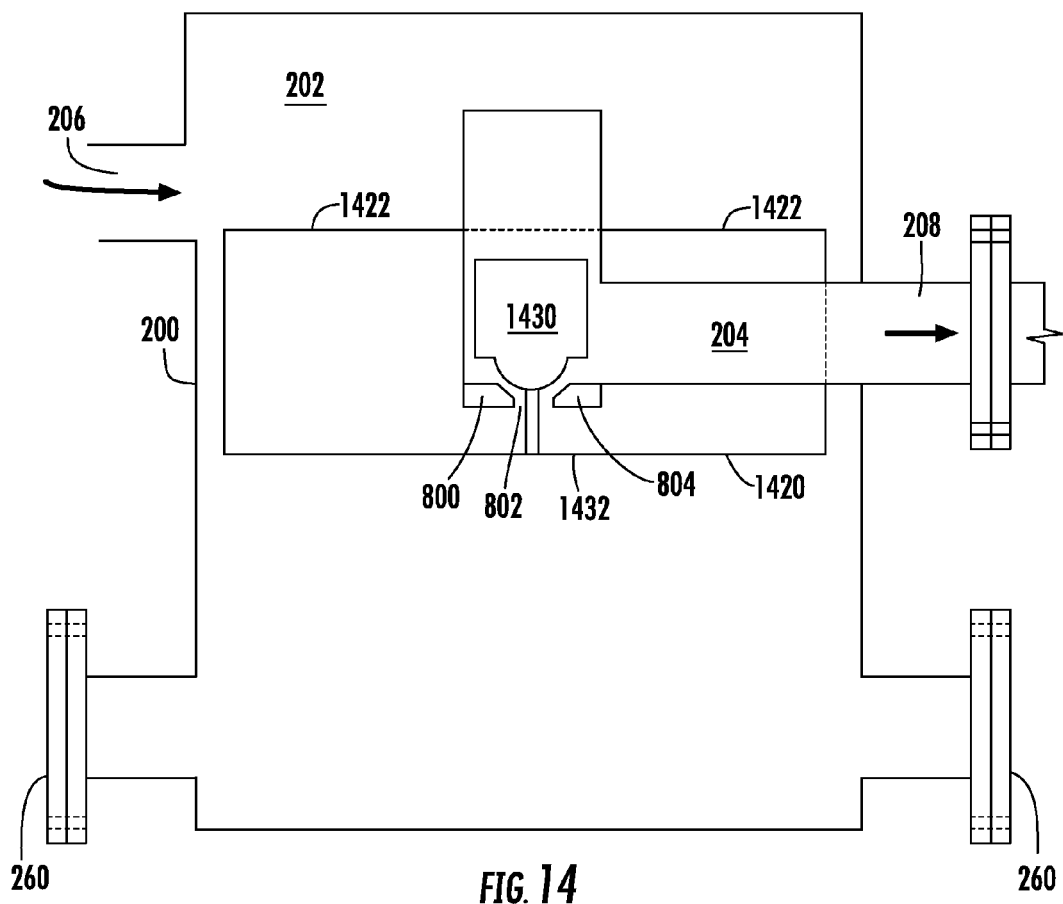
Figure 15:
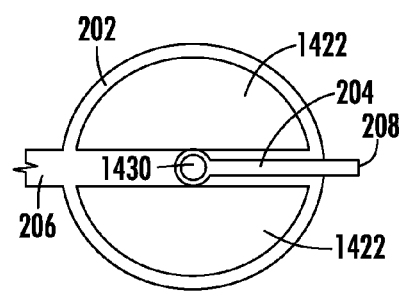
Figure 16:
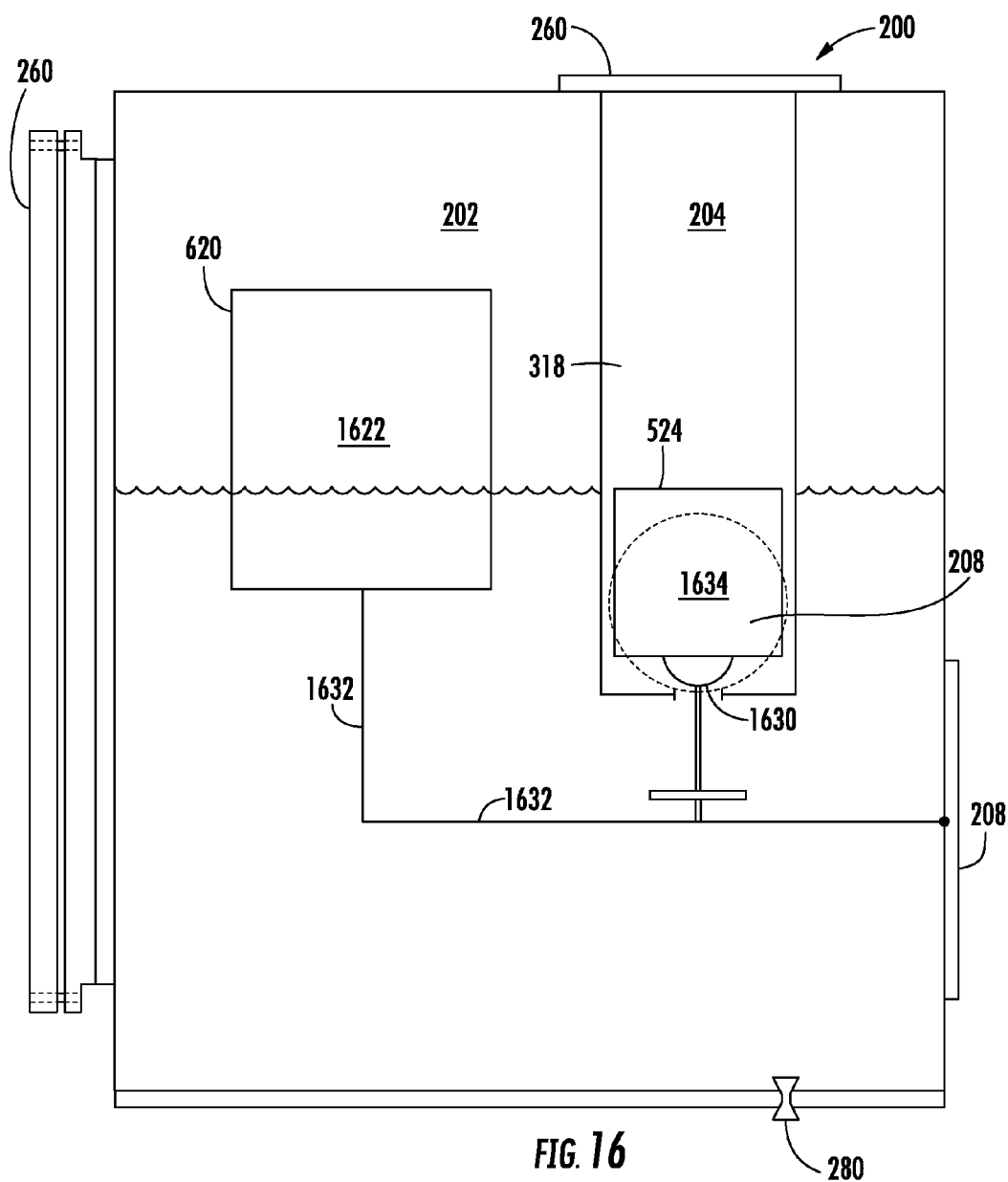
Figure 17:
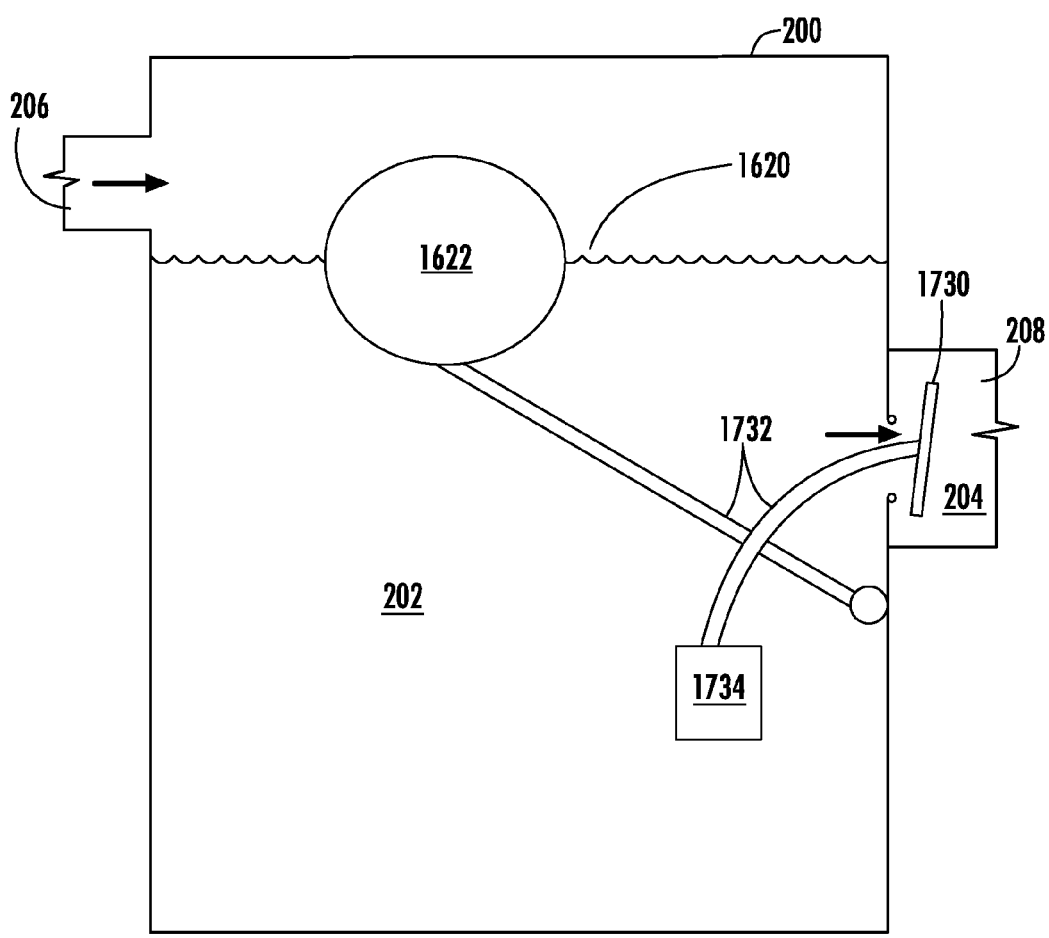
Figure 18:
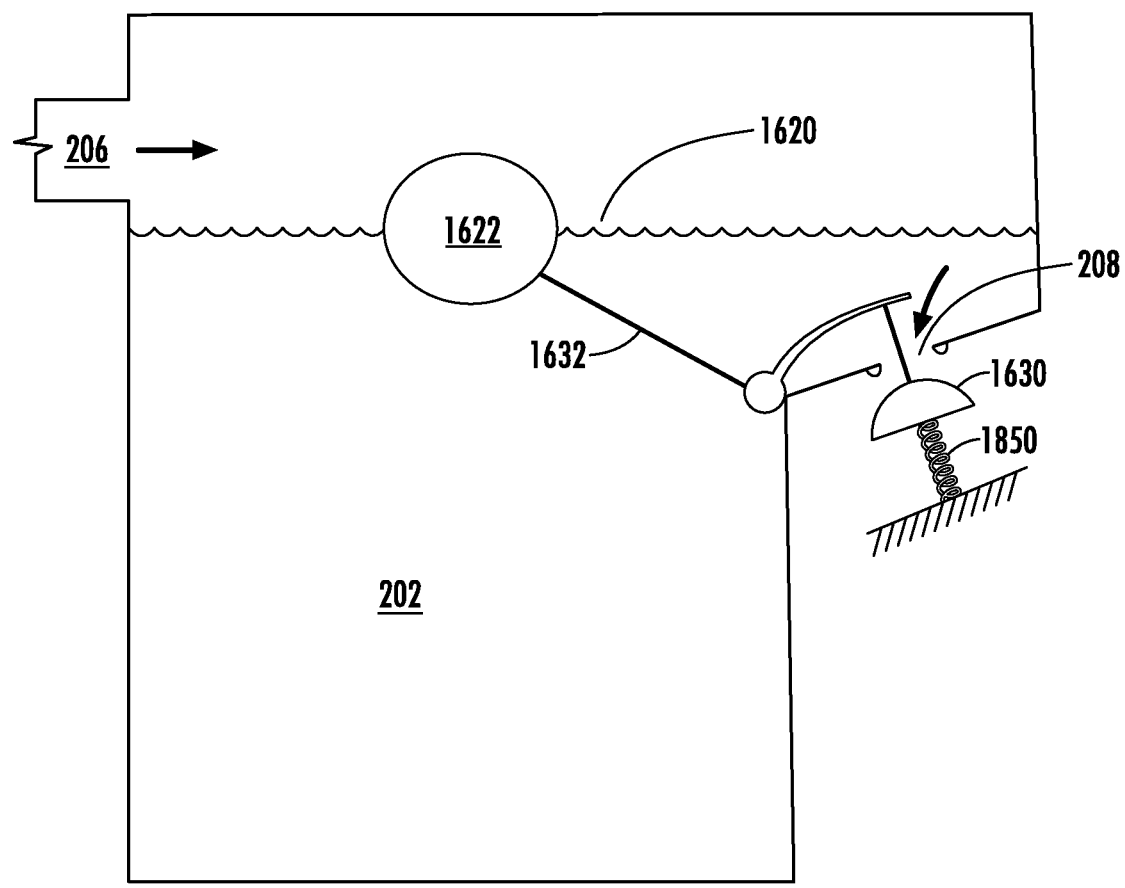
Figure 19:
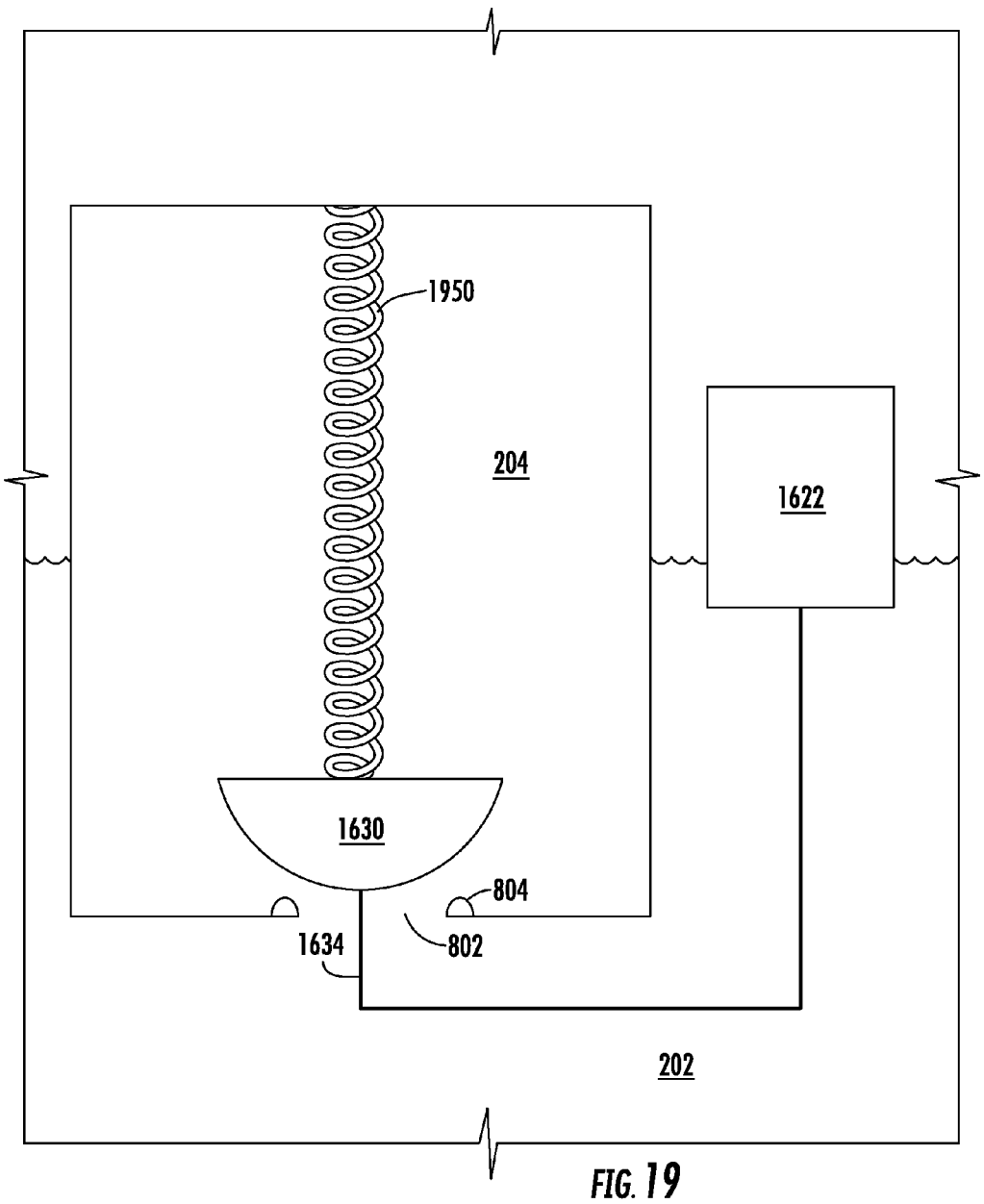
Figure 20:
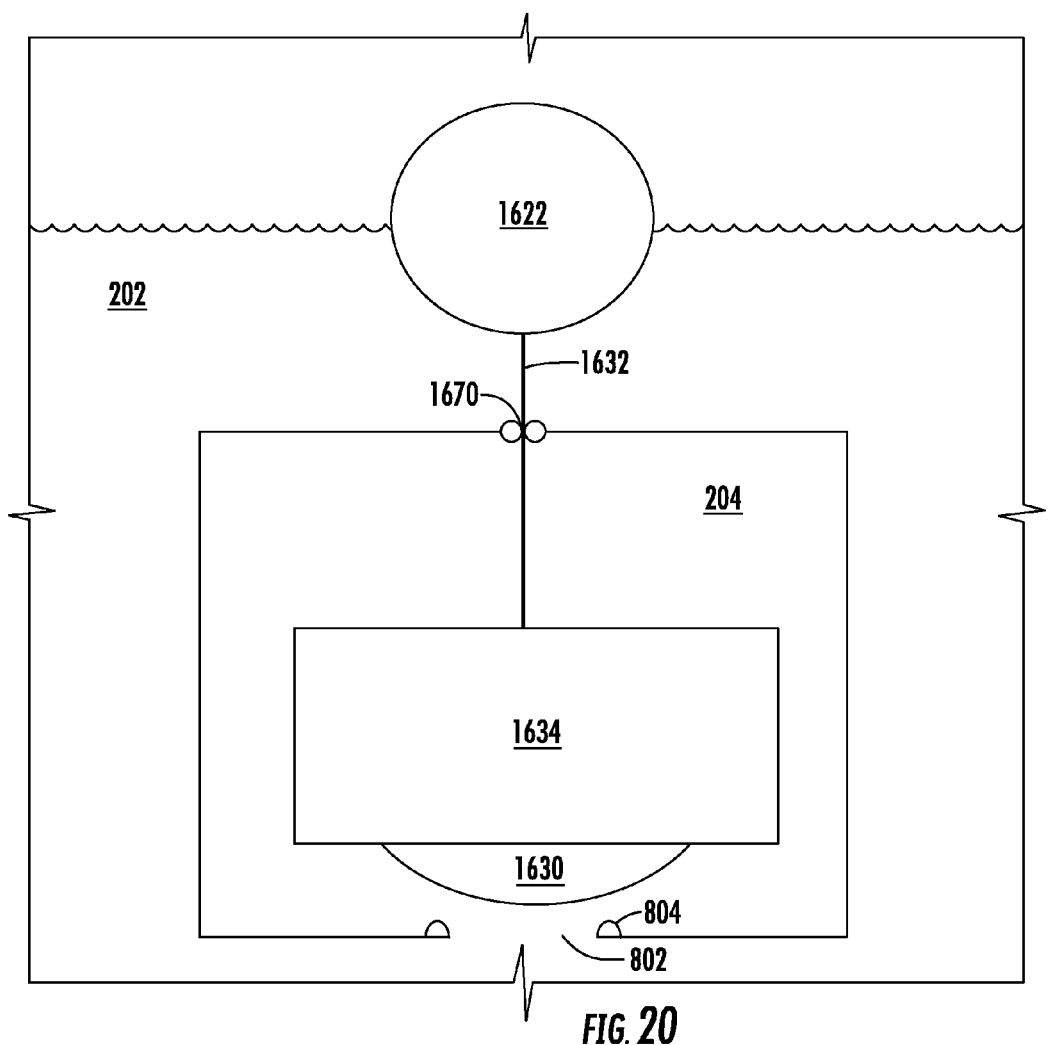
Figure 21:
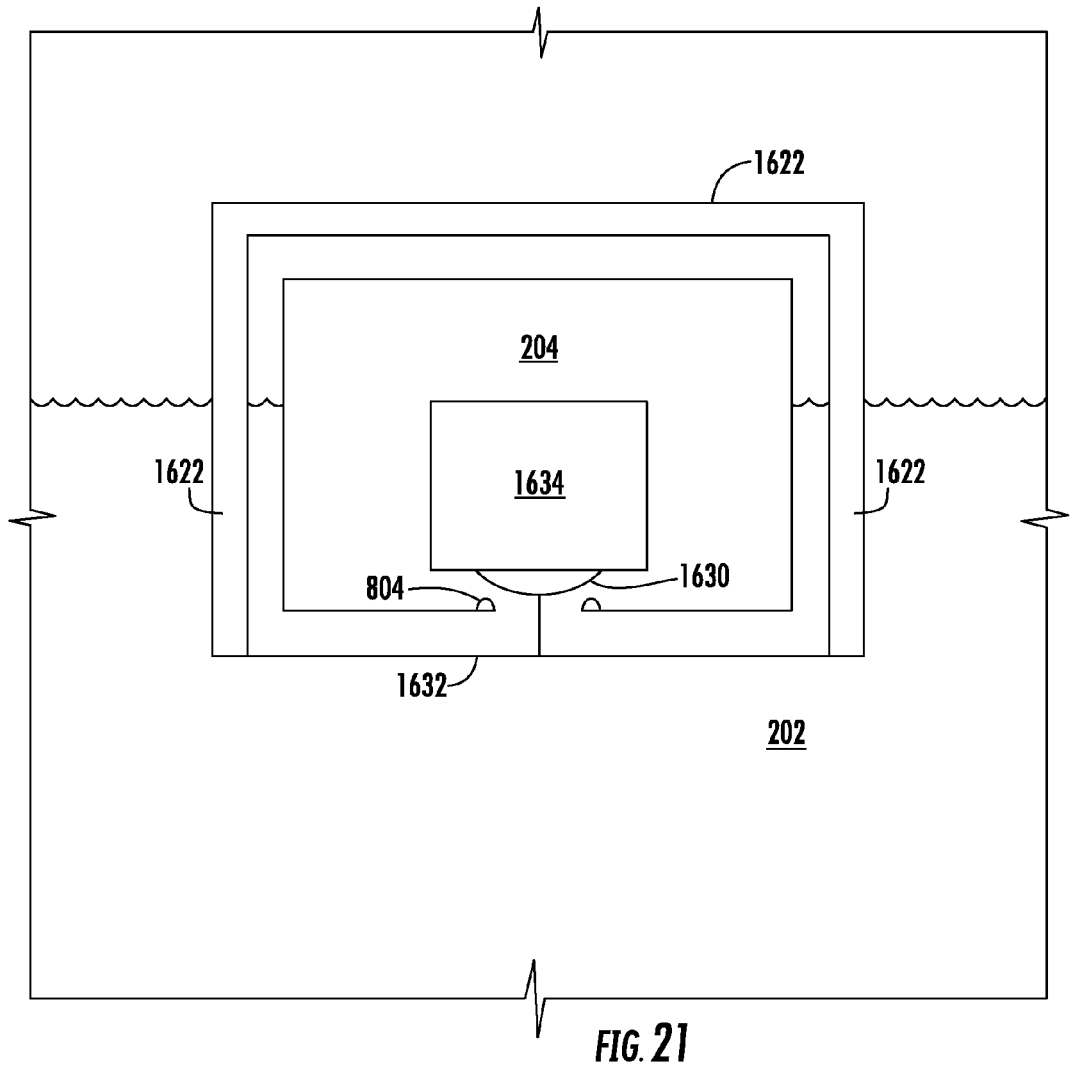
Figure 22:
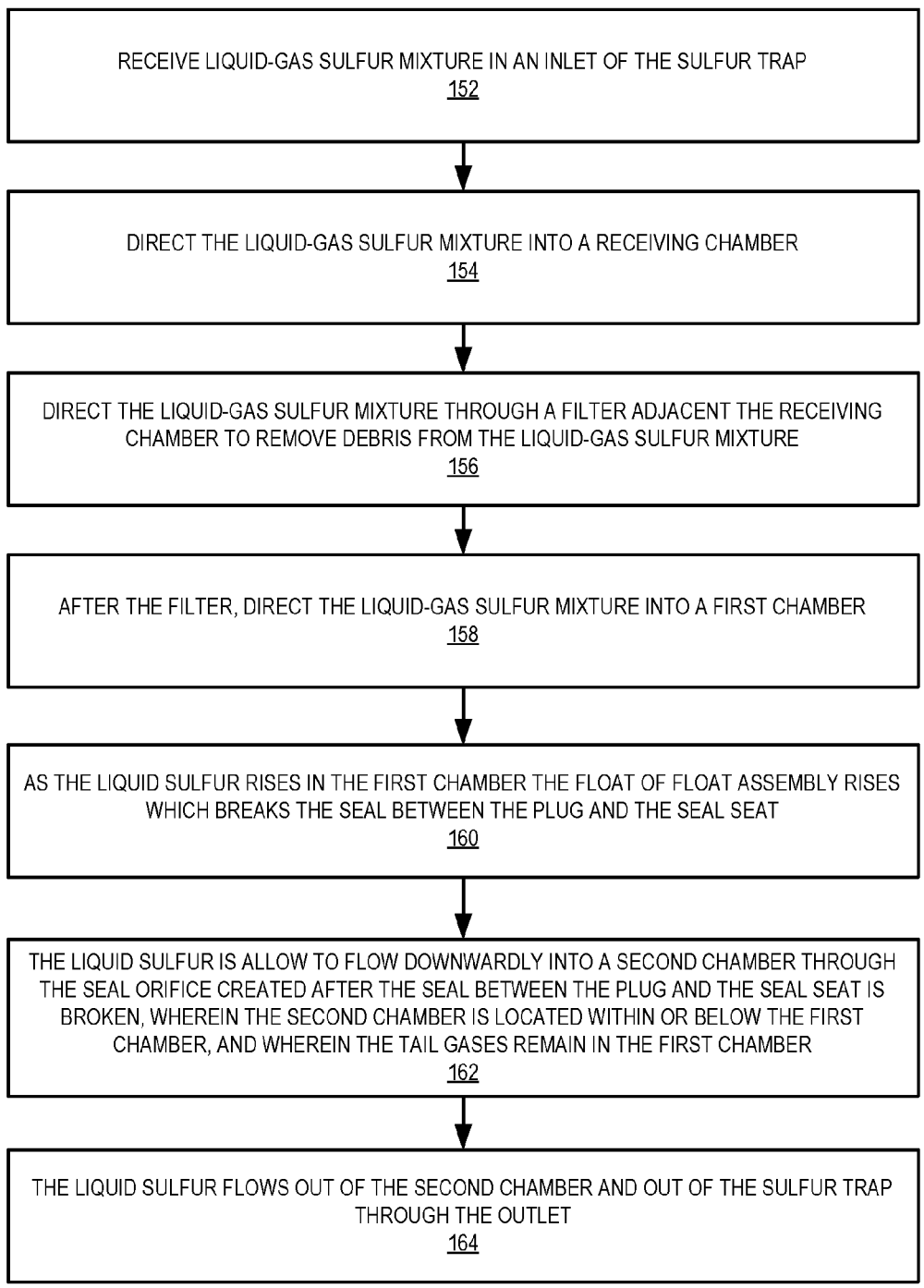
Figure 23:
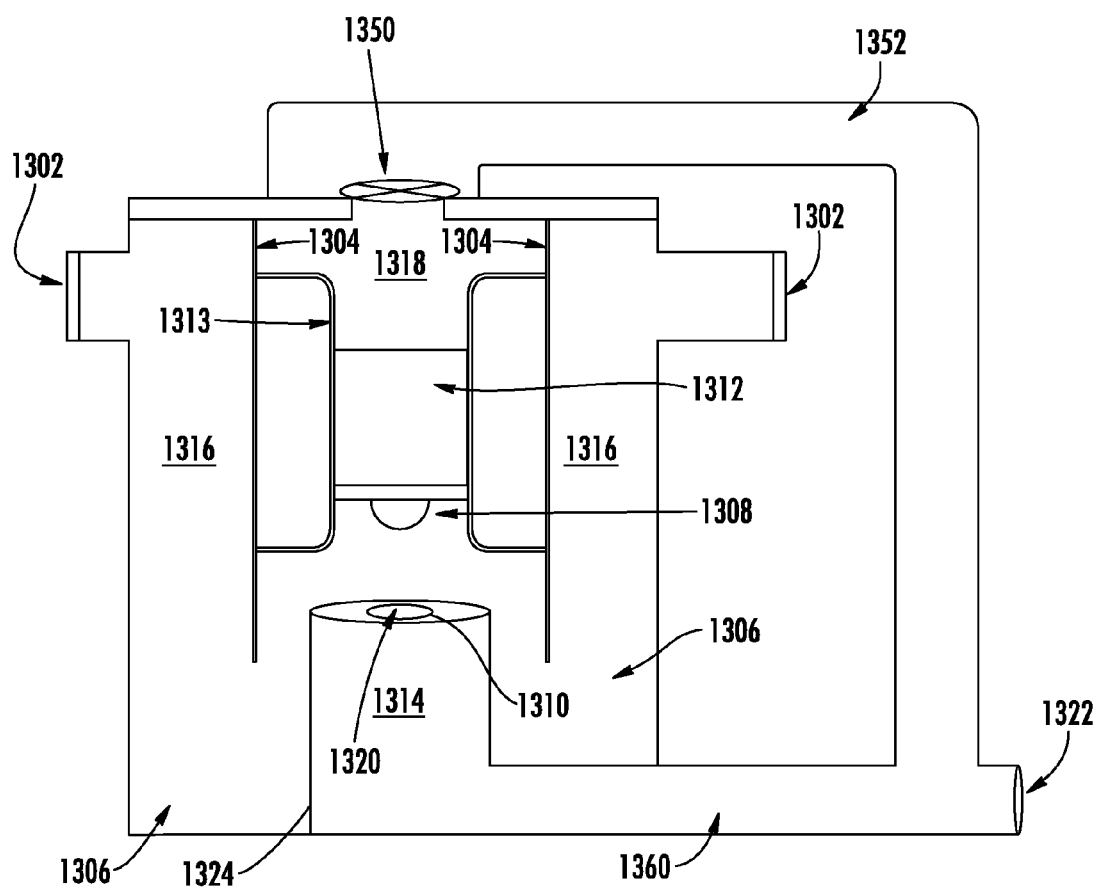
Figure 24A:
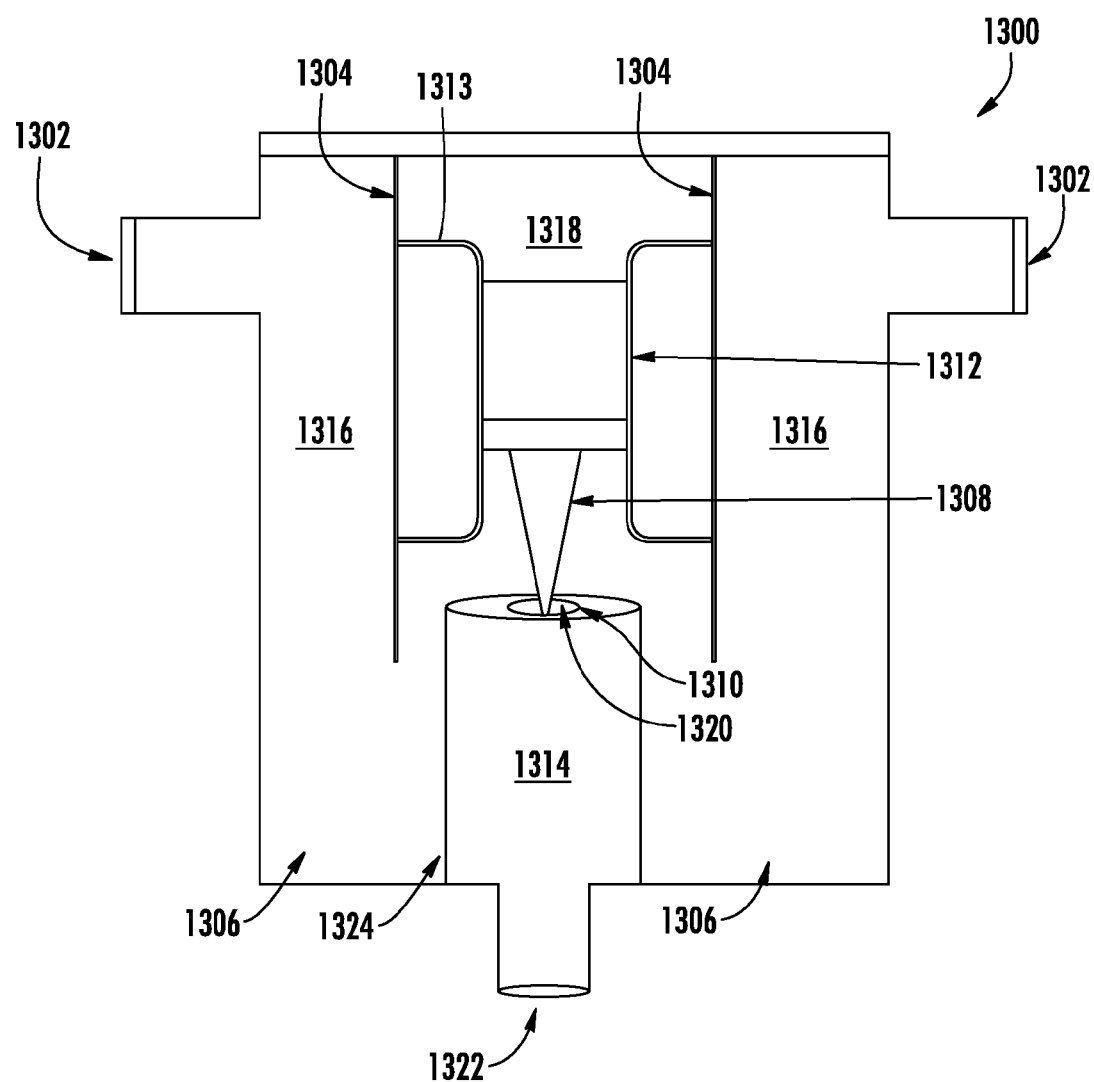
Figure 24B:
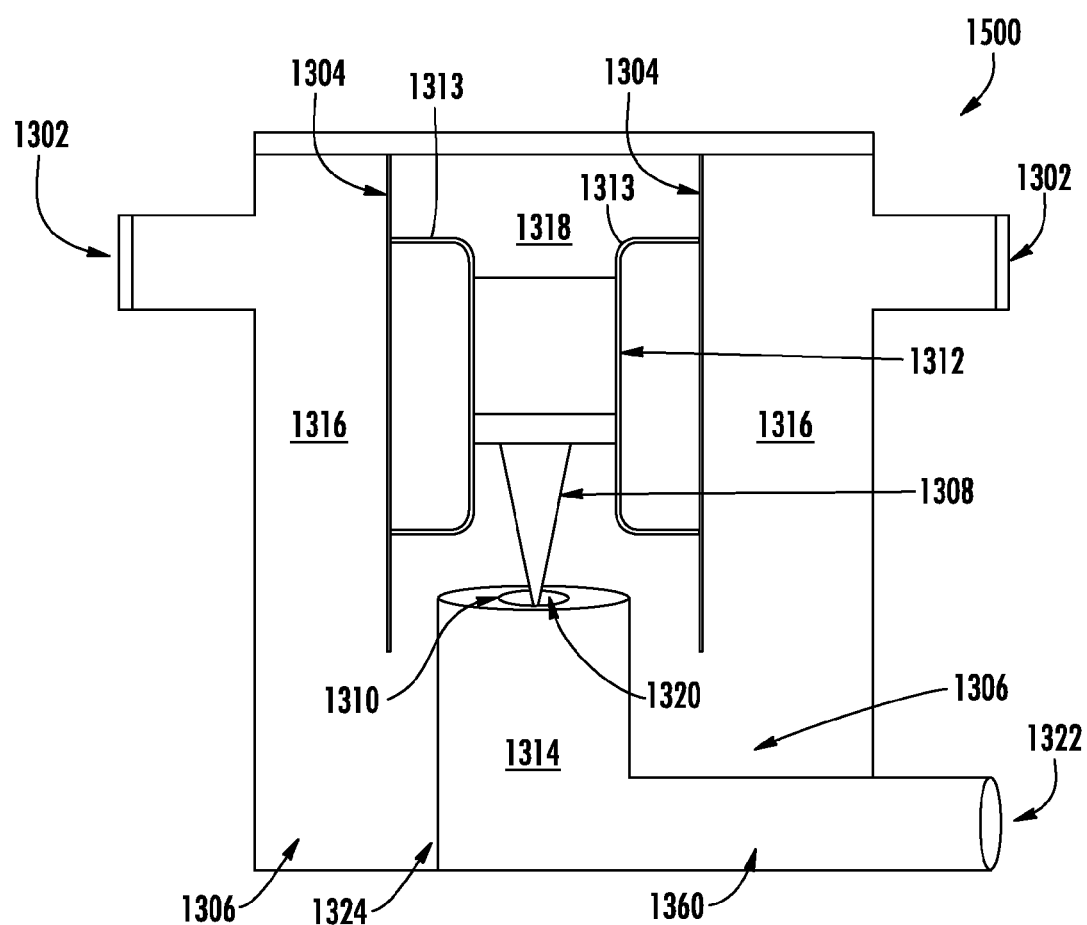
Figure 25:
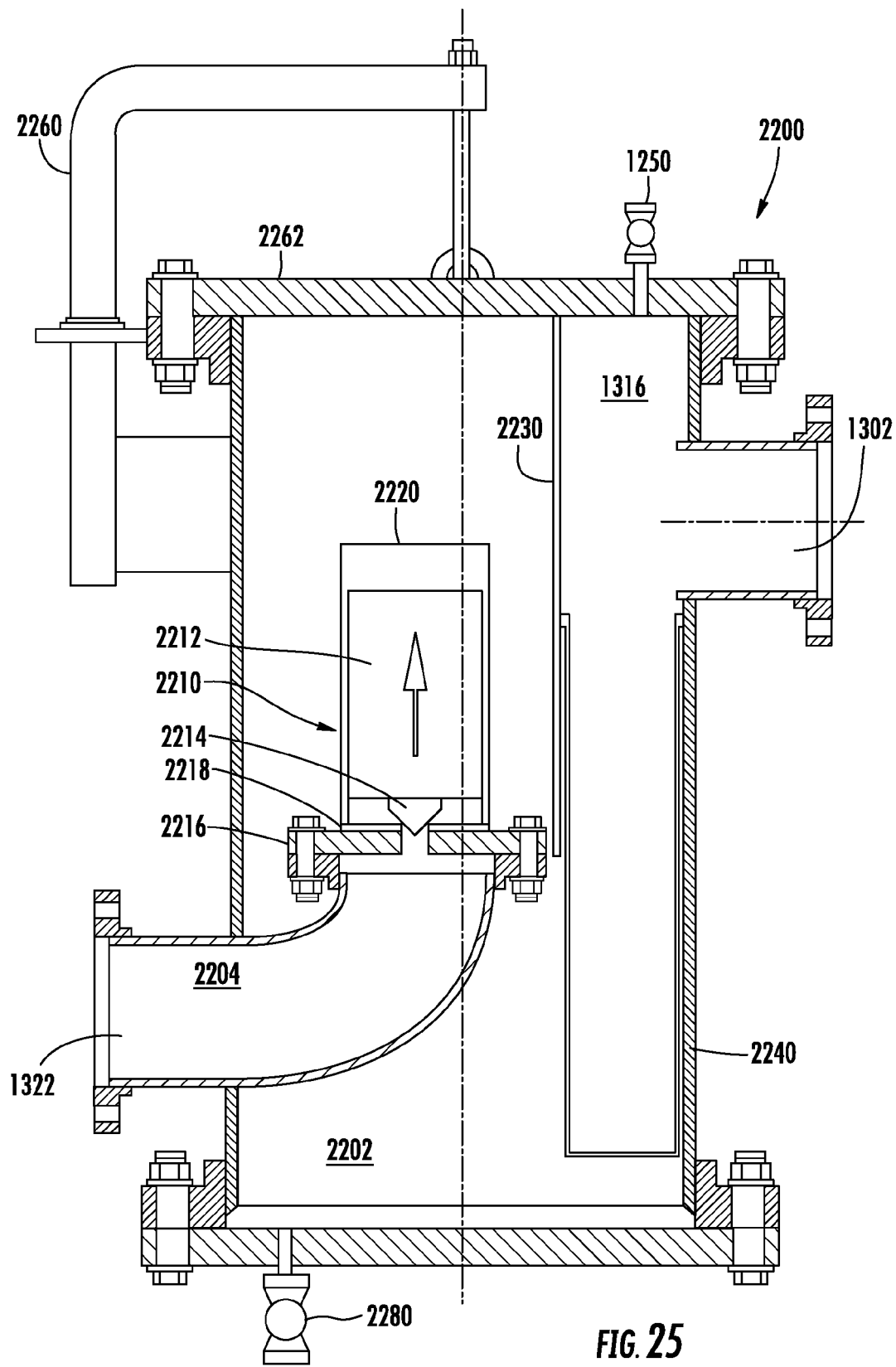
Figure 26:
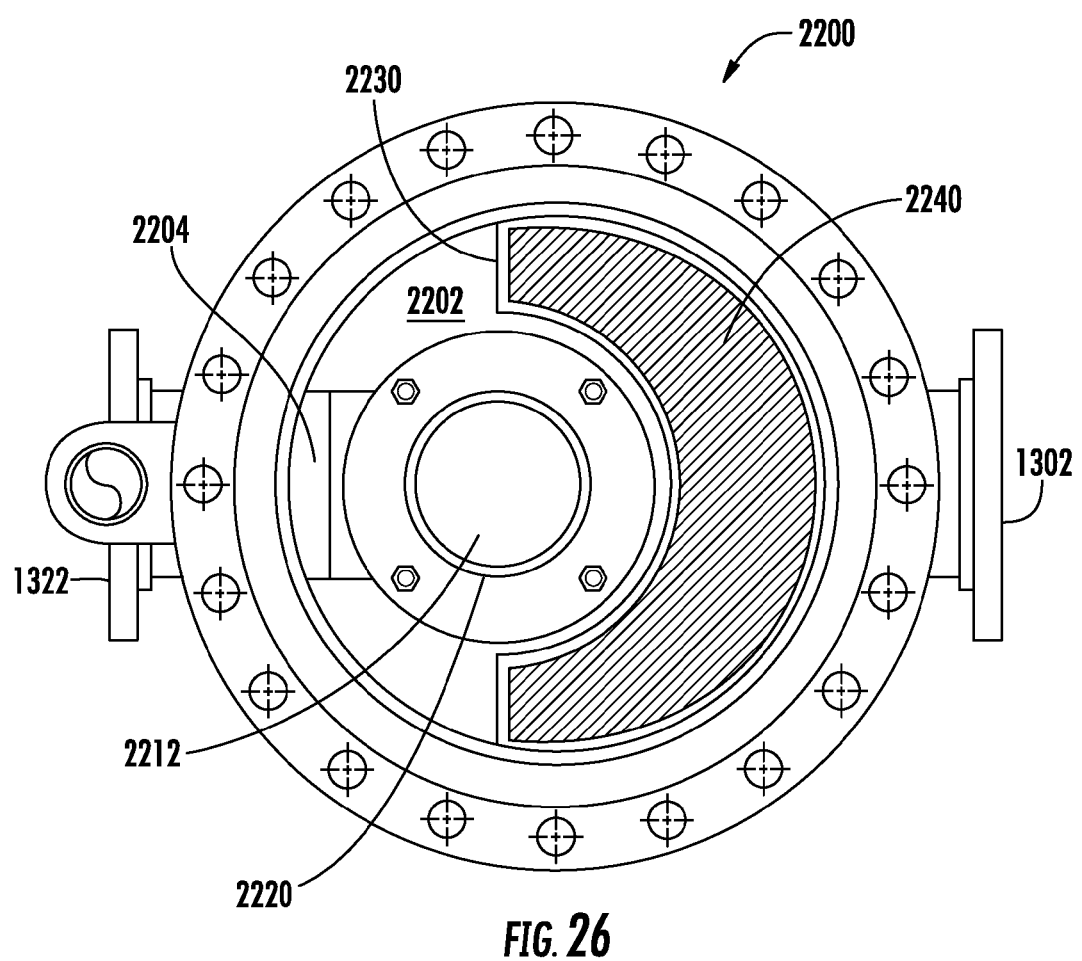
Figure 27:
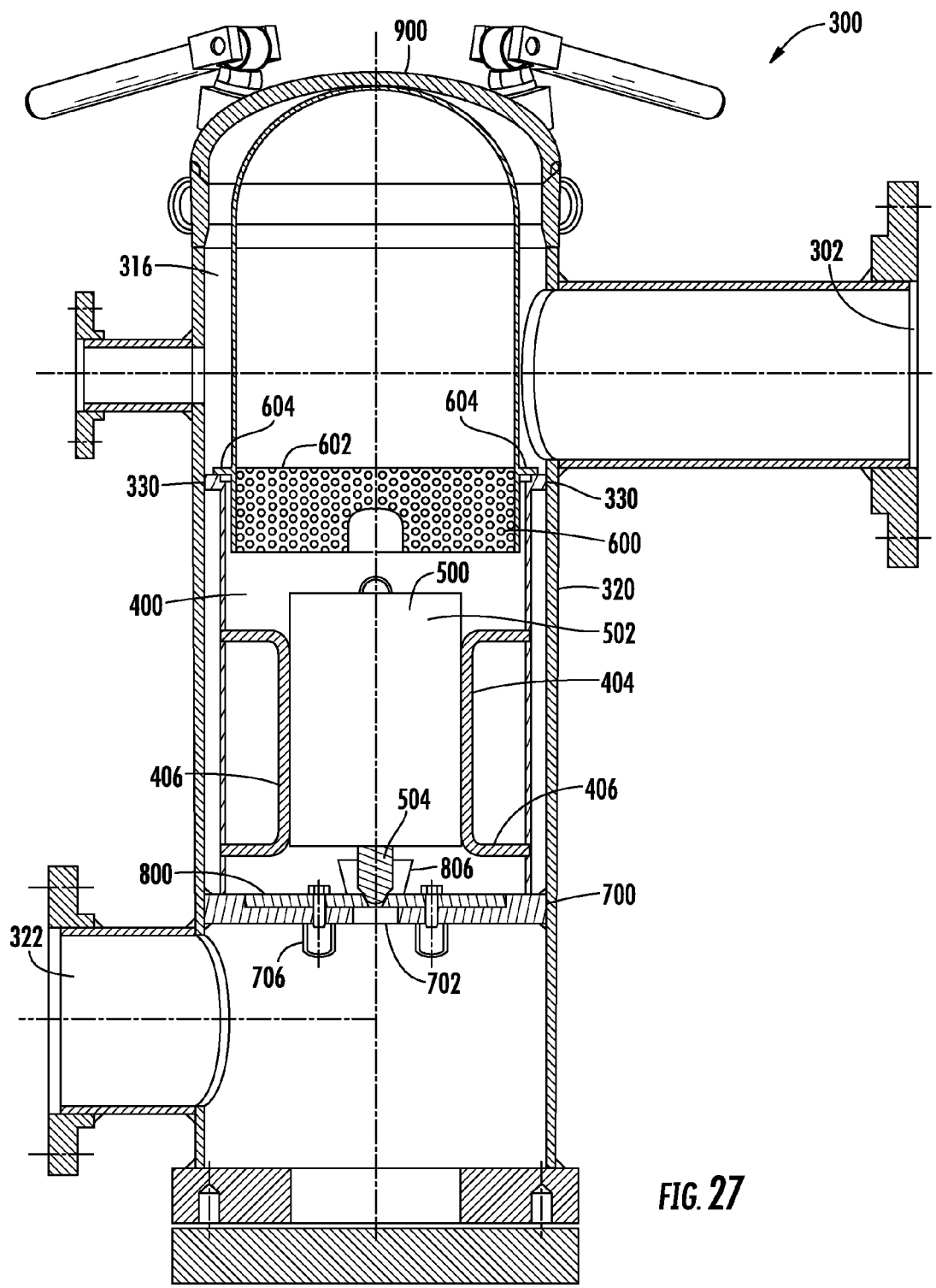
Figure 28:
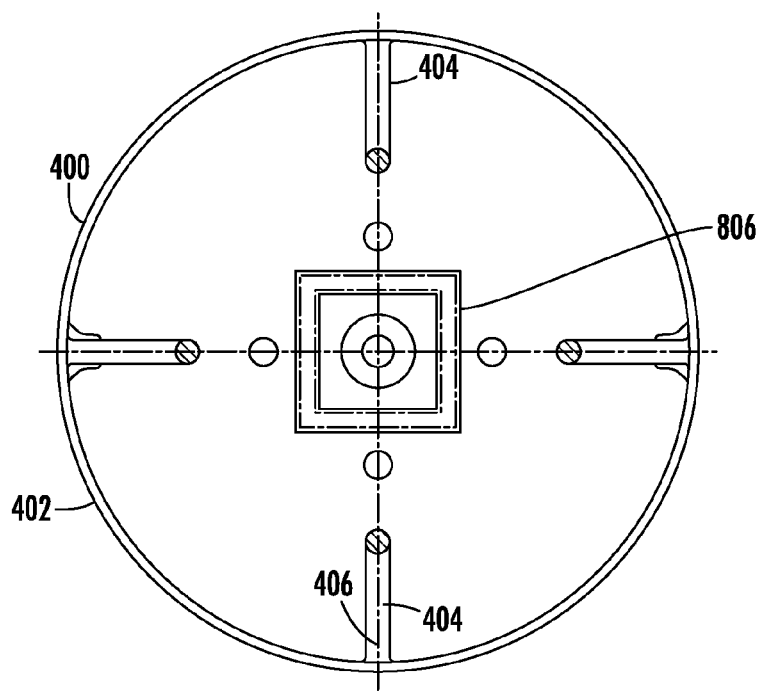
Figure 29:
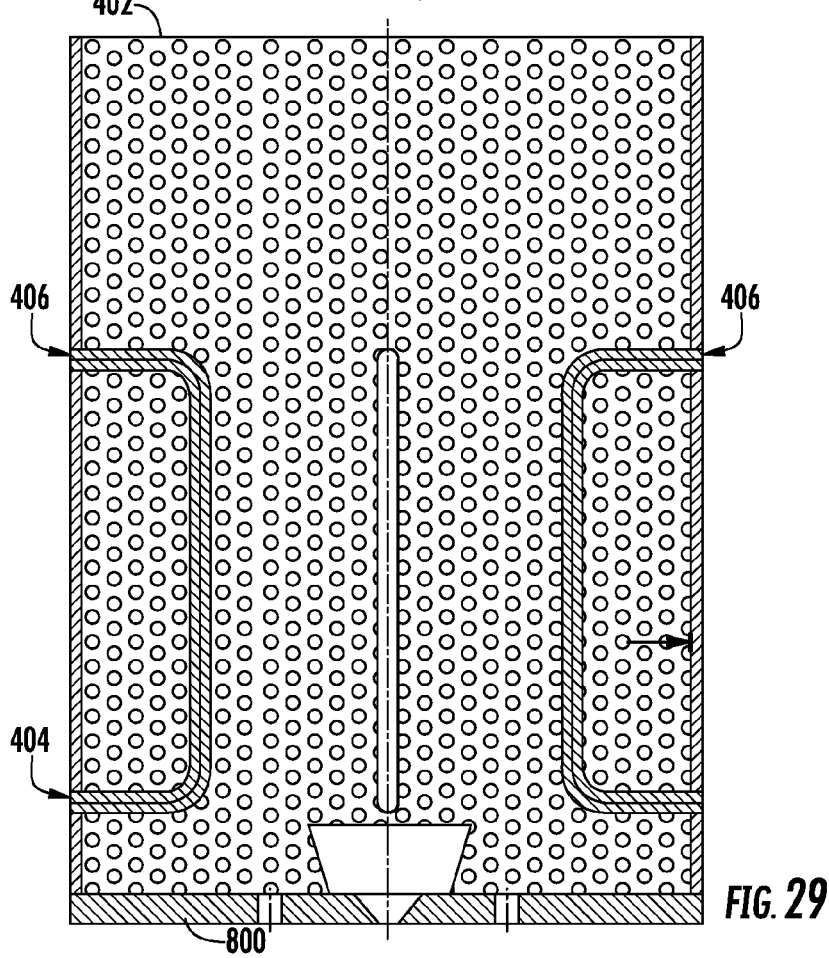
Figure 30:
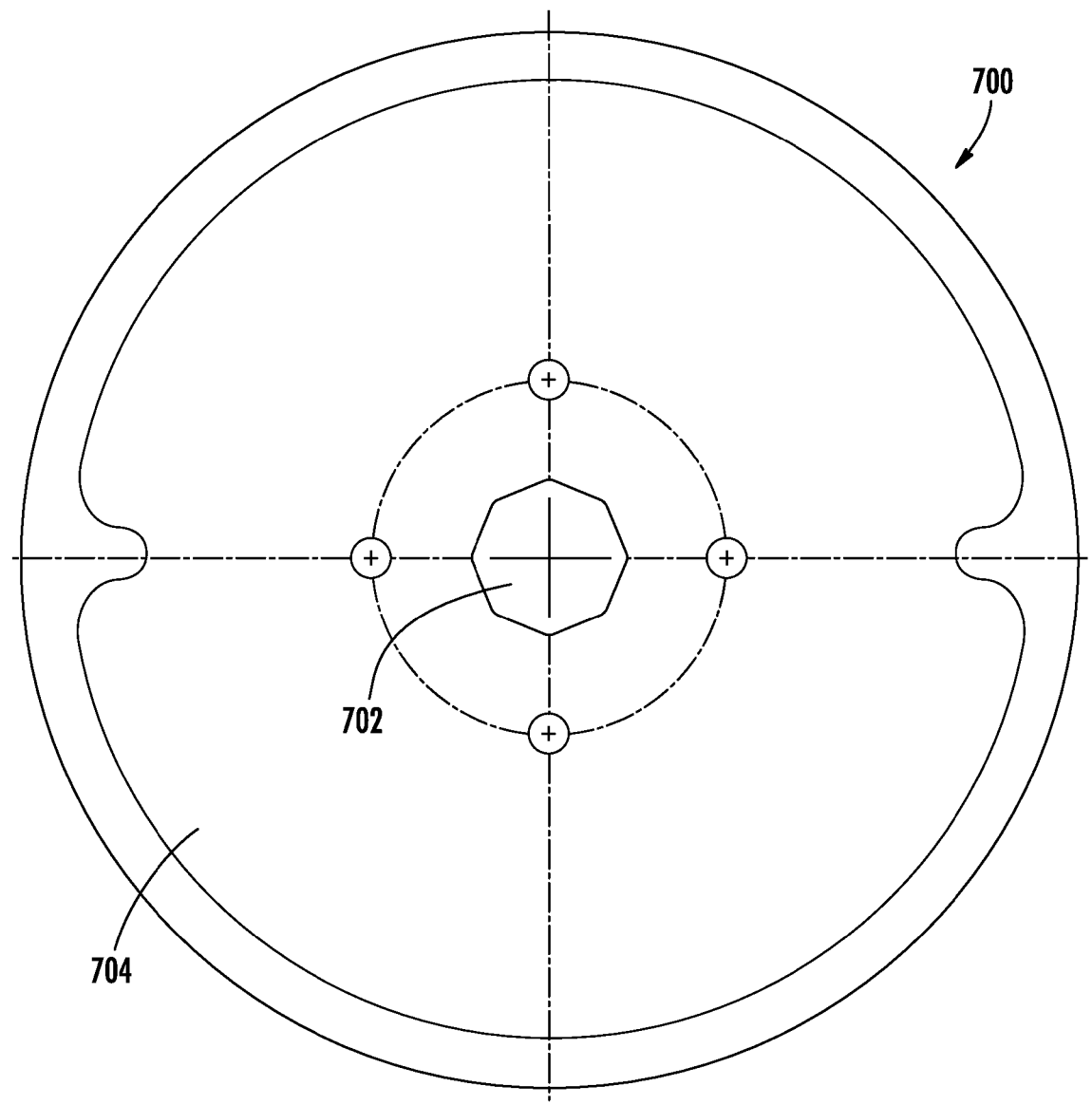
Figure 31:
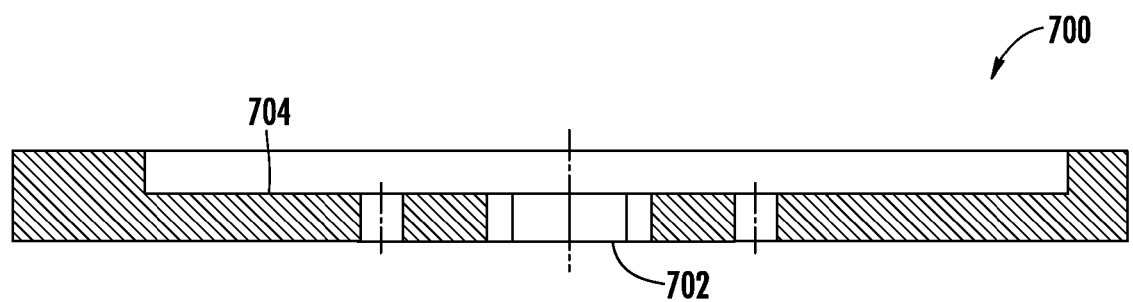
Figure 32:
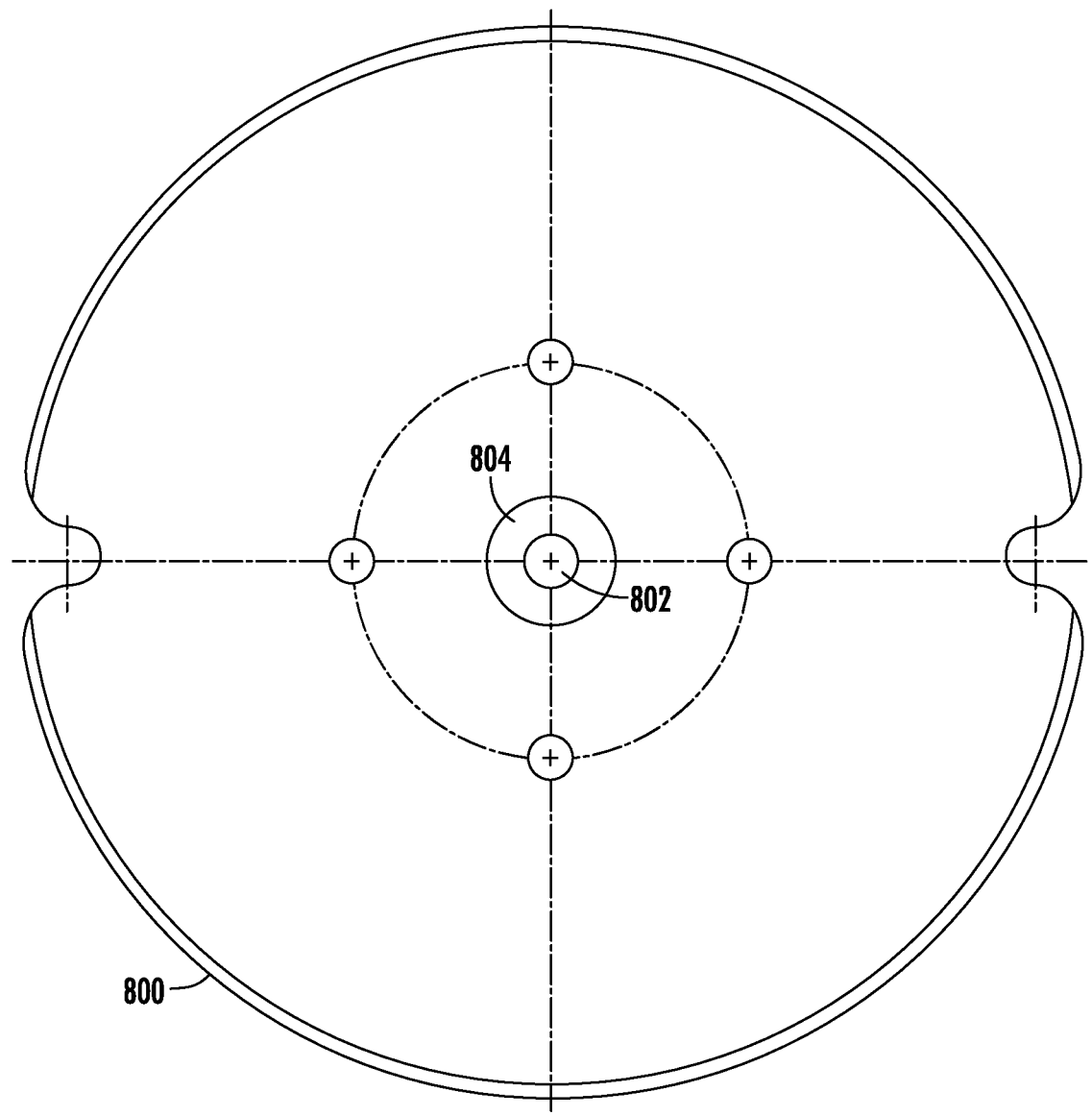
Figure 33:
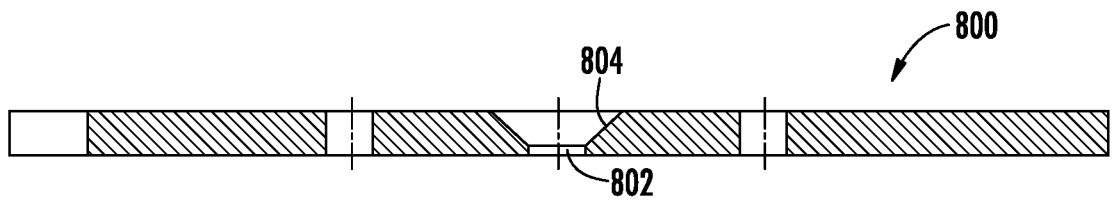
Figure 34:
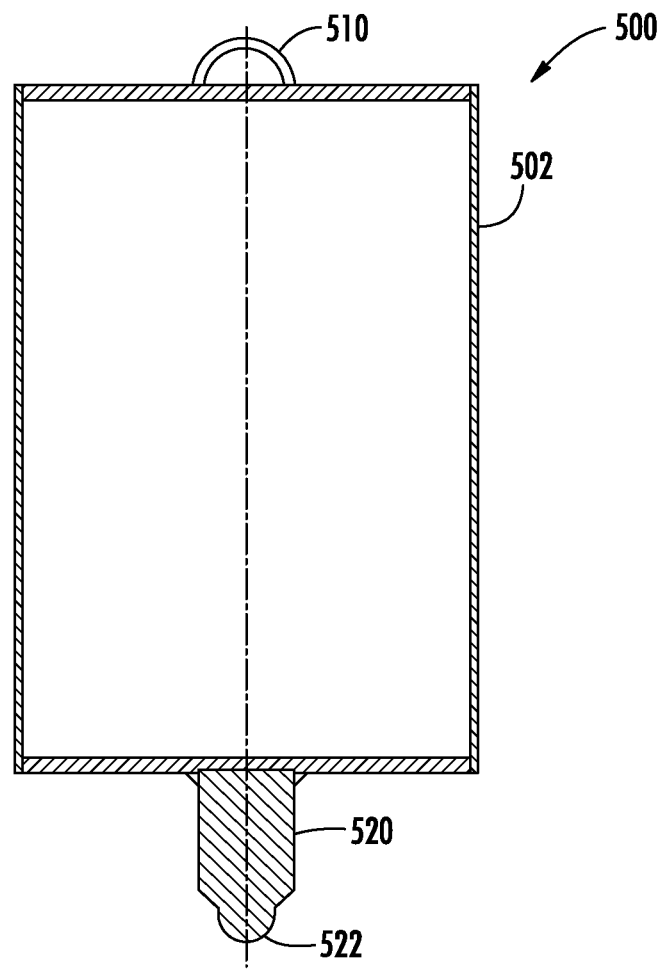
Figure 35:
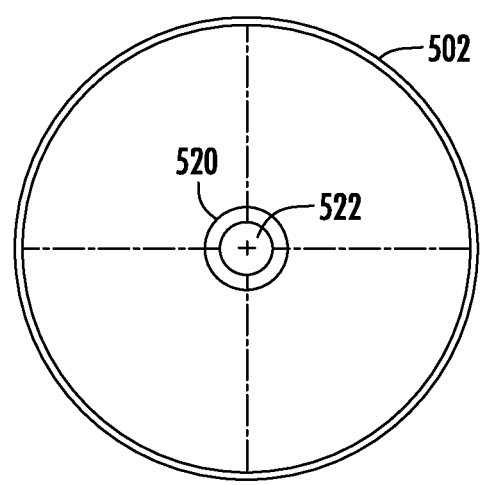
Figure 36:
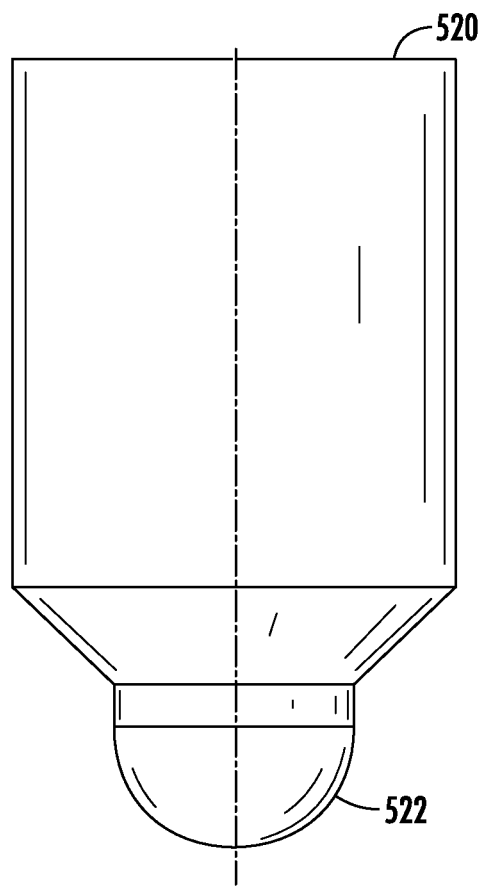
Figure 37:
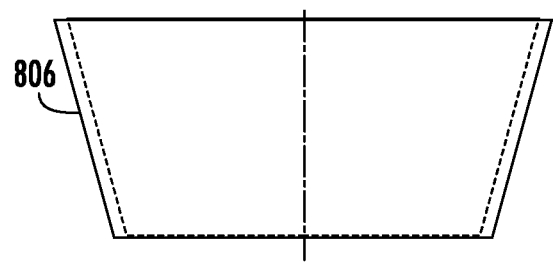
Figure 38:
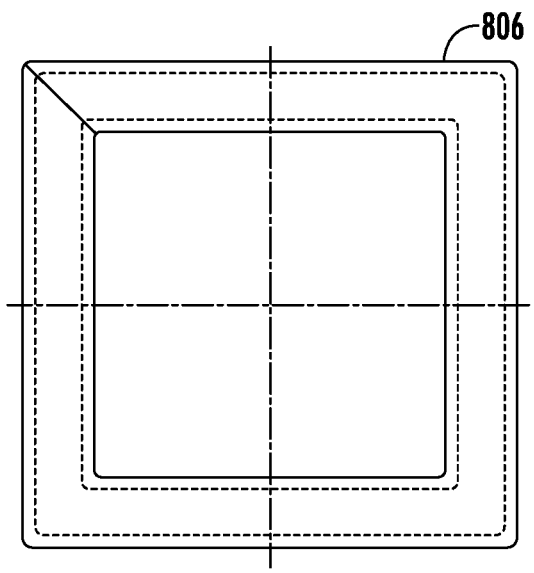
Figure 39:
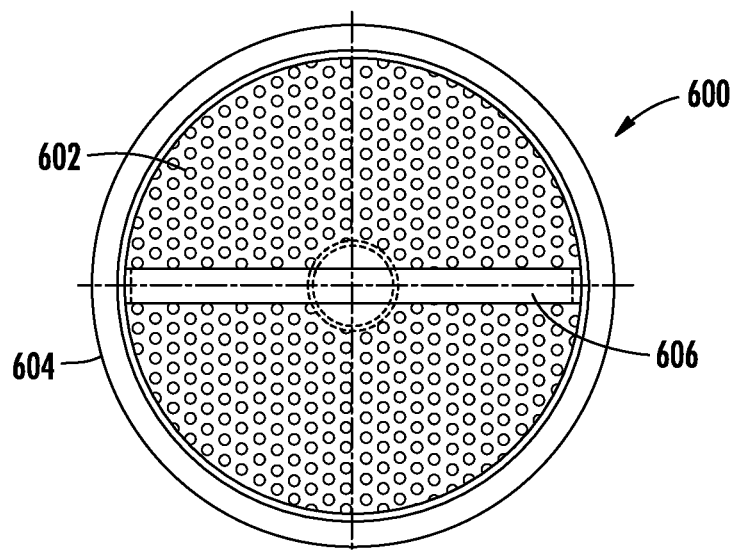
Figure 40:
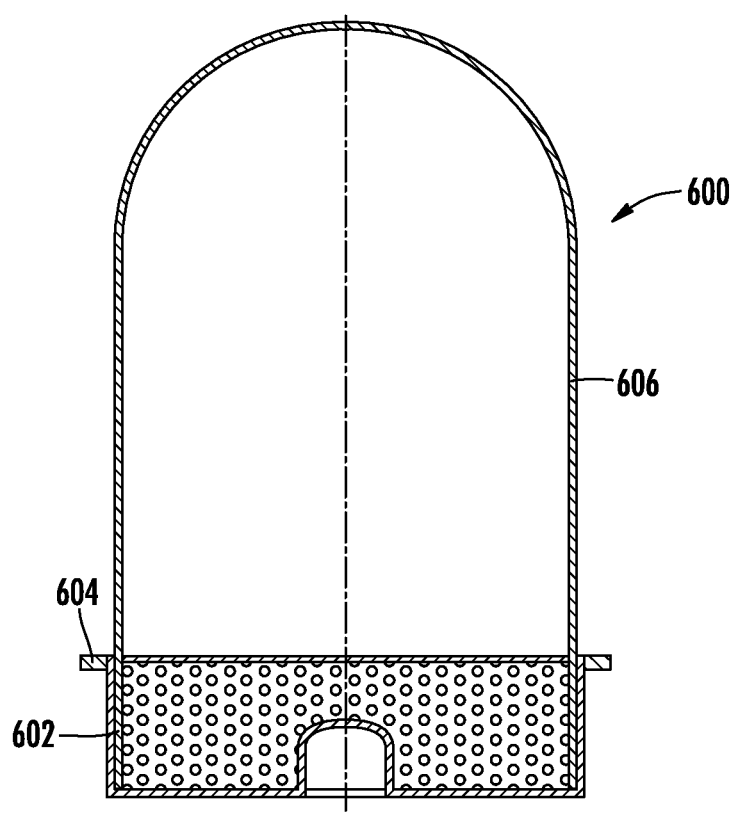
Figure 41:
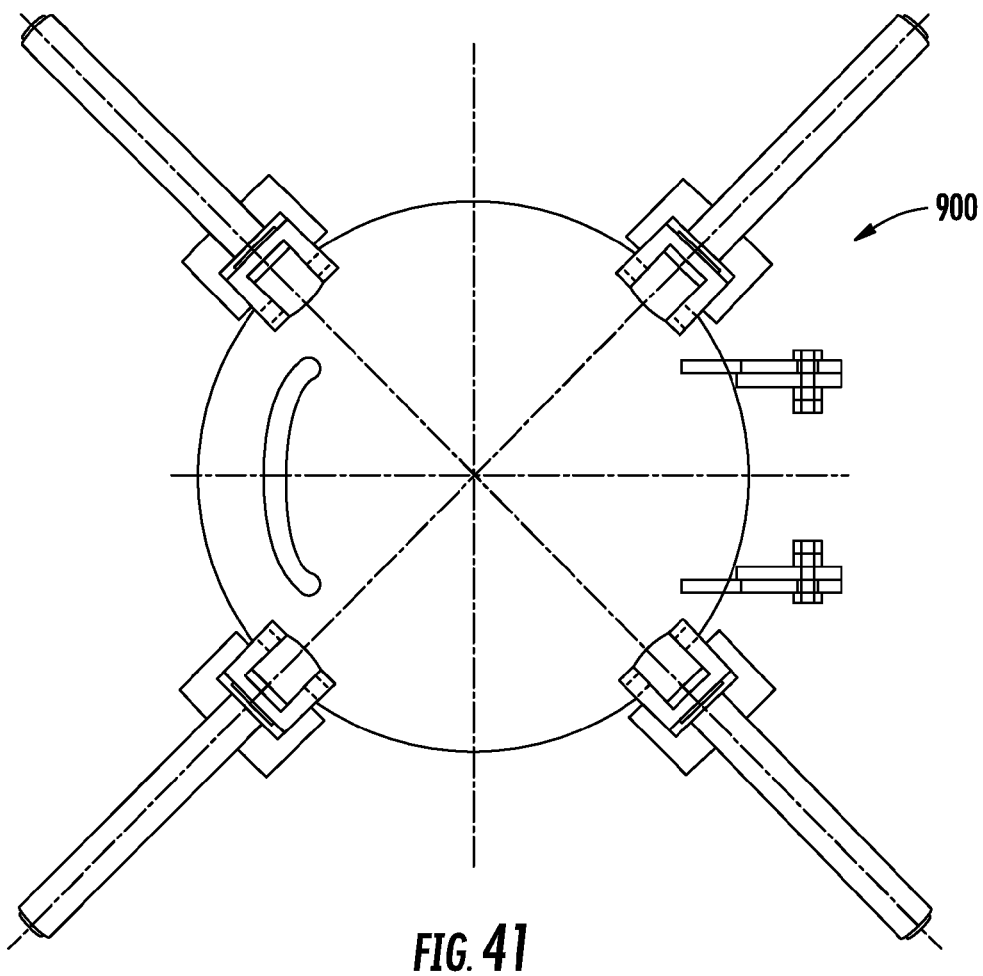
Figure 42:
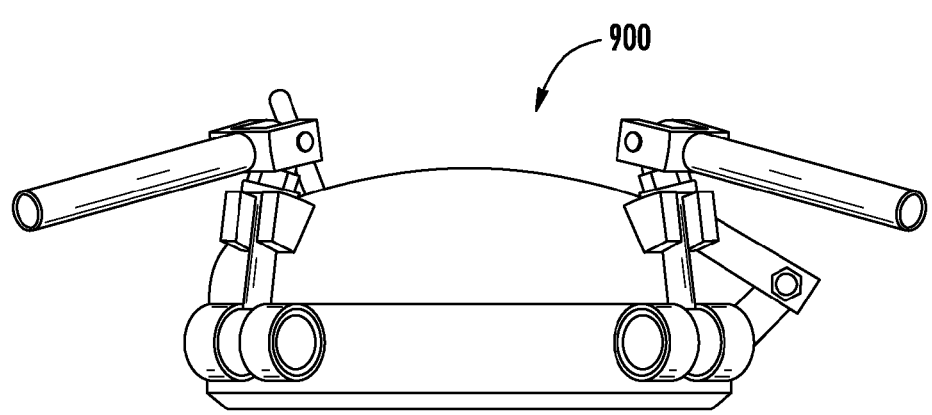
Figure 43:
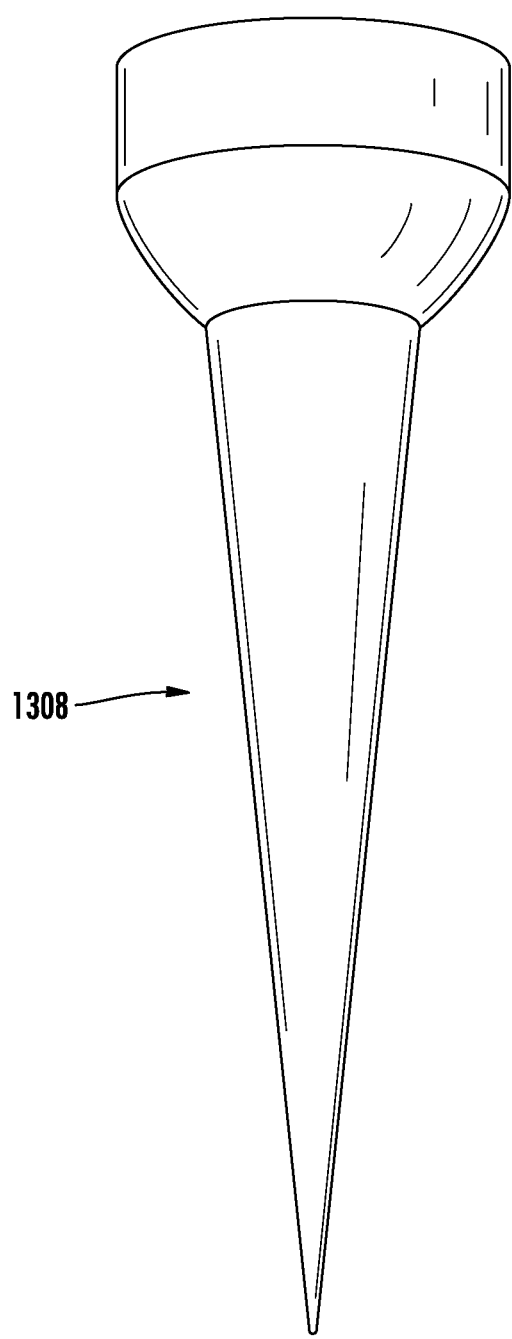

Having thus described embodiments of the invention in general terms, reference will now be made to the accompanying drawings, which are not necessarily drawn to scale, and wherein:

FIG. 1 illustrates a process flow for separating liquid sulfur from tail gases using a sulfur trap, in accordance with one embodiment of the invention;

FIG. 2 illustrates a cross-sectional view of a sulfur trap that allows for an upward flow of liquid sulfur, in accordance with one embodiment of the invention;

FIG. 3 illustrates a top view of the sulfur trap of FIG. 1 that allows for an upward flow of liquid sulfur, in accordance with one embodiment of the invention;

FIG. 4 illustrates a cross-sectional view of a float assembly from FIG. 1, in accordance with one embodiment of the invention;

FIG. 5a illustrates a top view of the float assembly from FIG. 3, in accordance with one embodiment of the invention;

FIG. 5b illustrates a bottom view of the float assembly from FIG. 3, in accordance with one embodiment of the invention;

FIG. 6 illustrates a top view of a divider from FIG. 1, in accordance with one embodiment of the invention;

FIG. 7 illustrates a cross-sectional view of the divider of FIG. 6, in accordance with one embodiment of the invention;

FIG. 8 illustrates a top view of a divider, in accordance with one embodiment of the invention;

FIG. 9 illustrates a cross-sectional view of the divider of FIG. 8, in accordance with one embodiment of the invention;

FIG. 10 illustrates a top view of a divider, in accordance with one embodiment of the invention;

FIG. 11 illustrates a cross-sectional view of the divider of FIG. 10, in accordance with one embodiment of the invention;

FIG. 12 illustrates a cross-sectional view of a sulfur trap that allows for an upward flow of liquid sulfur, in accordance with one embodiment of the invention;

FIG. 13 illustrates a top view of the sulfur trap of FIG. 12, in accordance with one embodiment of the invention;

FIG. 14 illustrates a cross-sectional view of a sulfur trap that allows for an upward flow of liquid sulfur, in accordance with one embodiment of the invention;

FIG. 15 illustrates a top view of the sulfur trap of FIG. 14, in accordance with one embodiment of the invention;

FIG. 16 illustrates a cross-sectional view of a sulfur trap that allows for an upward flow of liquid sulfur, in accordance with one embodiment of the invention;

FIG. 17 illustrates a cross-sectional view of a portion of the sulfur trap, in accordance with one embodiment of the invention;

FIG. 18 illustrates a cross-sectional view of a portion of a sulfur trap, in accordance with one embodiment of the invention;

FIG. 19 illustrates a cross-sectional view of a portion of a sulfur trap, in accordance with one embodiment of the invention;

FIG. 20 illustrates a cross-sectional view of a portion of sulfur trap, in accordance with one embodiment of the invention;

FIG. 21 illustrates a cross-sectional view of a portion of sulfur trap, in accordance with one embodiment of the invention;

FIG. 22 illustrates a process flow for separating liquid sulfur from tail gases using a sulfur trap, in accordance with one embodiment of the invention;

FIG. 23 illustrates a cross sectional view of a sulfur trap that allows for a downward flow of liquid sulfur, in accordance with one embodiment of the invention;

FIG. 24a illustrates a cross sectional view of a sulfur trap that allows for a downward flow of liquid sulfur, in accordance with one embodiment of the invention;

FIG. 24b illustrates a cross sectional view of a sulfur trap that allows for a downward flow of liquid sulfur, in accordance with one embodiment of the invention;

FIG. 25 illustrates a cross sectional view of a sulfur trap that allows for a downward flow of liquid sulfur, in accordance with one embodiment of the invention;

FIG. 26 illustrates a cross sectional view of a sulfur trap that allows for a downward flow of liquid sulfur, in accordance with one embodiment of the invention;

FIG. 27 illustrates a cross sectional view of a sulfur trap that allows for a downward flow of liquid sulfur, in accordance with one embodiment of the invention;

FIG. 28 illustrates a top view of a portion of a float assembly of the sulfur trap of FIG. 27, in accordance with one embodiment of the invention;

FIG. 29 illustrates a cross sectional view of the portion of the float assembly of FIG. 28, in accordance with one embodiment of the invention;

FIG. 30 illustrates a top view of a divider of the sulfur trap of FIG. 27, in accordance with one embodiment of the invention;

FIG. 31 illustrates a cross sectional view of the divider of FIG. 30, in accordance with one embodiment of the invention;

FIG. 32 illustrates a top view of a seal plate of the sulfur trap of FIG. 27, in accordance with one embodiment of the invention;

FIG. 33 illustrates a cross sectional view of the seal plate of FIG. 32, in accordance with one embodiment of the invention;

FIG. 34 illustrates a cross sectional view of a float and plug of the sulfur trap of FIG. 27, in accordance with one embodiment of the invention;

FIG. 35 illustrates a bottom view of the float and plug of FIG. 34, in accordance with one embodiment of the invention;

FIG. 36 illustrates the plug of FIG. 34, in accordance with one embodiment of the invention;

FIG. 37 illustrates a side view of a debris guard of the sulfur trap of FIG. 27, in accordance with one embodiment of the invention;

FIG. 38 illustrates a top view of the debris guard of FIG. 37, in accordance with one embodiment of the invention;

FIG. 39 illustrates a top view of a debris basket of the sulfur trap of FIG. 27, in accordance with one embodiment of the invention;

FIG. 40 illustrates a cross sectional view of the debris basket of FIG. 39, in accordance with one embodiment of the invention;

FIG. 41 illustrates a top view of a sulfur trap top of the sulfur trap of FIG. 27, in accordance with one embodiment of the invention;

FIG. 42 illustrates a side view of the sulfur trap top of FIG. 41, in accordance with one embodiment of the invention; and FIG. 43 illustrates a plug for a sulfur trap, in accordance with one embodiment of the invention.

DETAILED DESCRIPTION OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates a liquid-gas sulfur separation process 100 for separating liquid sulfur from tail gases using a sulfur trap 200, in accordance with one embodiment of the invention. The liquid-gas sulfur separation process 100 is described in further detail herein with respect to the other drawings, but generally the liquid-gas mixture is received in the sulfur trap through an inlet, as illustrated by block 102. As illustrated by block 104, the liquid-gas mixture received at the inlet is directed into a first chamber located at least partially below a second chamber. Debris in the liquid-gas sulfur mixture, as illustrated by block 106, settles on the floor of the sulfur trap due to the force of gravity. As illustrated by block 108, as the liquid sulfur rises in the first chamber the float of the float assembly rises, which breaks the seal between the plug and the seal seat. After the seal between the plug and seal seat is broken a seal orifice is created, as illustrated by block 110, and the liquid sulfur is allowed to flow upwardly through the seal orifice and into the second chamber. The liquid sulfur flows out of the second chamber and out of the sulfur trap through the outlet, as illustrated by bock 112. Furthermore, the float assembly is sized, such that during an overpressure event liquid-gas mixture of a desired pressure breaks the seal between the plug and the seal seat, and allows the liquid-gas mixture to flow into the second chamber to relieve the overpressure event, as illustrated by block 114.

FIG. 2 illustrates a cross-sectional view of a sulfur trap 200 in accordance with one embodiment of the invention, wherein the sulfur trap 200 separates liquid sulfur from tail gases and allows the liquid sulfur to flow upwards through the sulfur trap 200. The sulfur trap 200 illustrated in FIG. 2 comprises a first chamber 202 (e.g., an inlet chamber, ballast chamber, or receiving chamber) and a second chamber 204 (e.g., an outlet chamber, seal chamber, or exit chamber). In the illustrated embodiment, such as for a sulfur trap 200 with upward liquid sulfur flow, the first chamber 202 is located at least partially below the second chamber 204. The sulfur trap 200 of FIG. 3 is illustrated without a top, but it is understood that embodiments of the sulfur trap 200 will have a top in order to create a liquid-gas tight sulfur trap 200, as is illustrated in FIG. 2. FIG. 3 illustrates a top view of the sulfur trap 200 and divider 700, which separates the first chamber 202 from the second chamber 204, and which is discussed in further detail later.

In some embodiments of the invention, the first chamber 202 has a float assembly 220 that is located at least partially within the first chamber 202. As illustrated in FIG. 4, the float assembly 220 comprises a float 222 that is operatively coupled to a plug 230, and which is used to create a liquid and/or air tight seal in the divider 700 between the first chamber 202 and the second chamber 204. The float 222 is generally an air and liquid tight container that will float in liquid sulfur. The float 222, in some embodiments, as illustrated, is a cylindrical doughnut shaped container, which is filled with air, another gas, or a liquid that floats within a desired amount of liquid sulfur. In other embodiments of the invention the float 222 may be spherical, rectangular, square, or any other type of shape. In the illustrated embodiment the plug 230 is operatively coupled to the float 222 in the float assembly 220 through the use of a plug connecting member 232, such as a rod and associated rod support structure. In the illustrated embodiment the connecting member 232 is operatively coupled to a base 234 made of a circular ring 236 and cross-bracing 238, which that is operatively coupled to a float wall 224, as illustrated in FIGS. 4 and 5a. The plug connecting member 232, may be one or more of a rod, chain, or the like. The plug connecting member 232 may be a single member or a combination of multiple members coupled together. The plug connecting member 232 may be a rod that is circular, square, flat plate, c-shaped, u-shaped, or any other type of shape. The chain (not illustrated) may be any type of chain with links, pinned connectors, or other type of configurations. The plug connecting member 232, along with the float 222, may also be buoyant in liquid sulfur such that it helps to move the plug 230 along with the float 222 as the liquid sulfur rises in the first chamber 202. As previously described and as illustrated in FIG. 4, the plug connecting member 232 is operatively coupled to the plug 230 and the float 222. In one embodiment the plug 230 is located at least partially within the second chamber 204, and the float 222 and plug connecting member 232 are located at least partially within the first chamber 202.

As described in further detail later, the divider 700 is operatively coupled to an outlet channel 240 (e.g., first chamber exit pipe, or the like) as illustrated in FIG. 2. The outlet channel 240 allows for the flow of the liquid sulfur from the first chamber 202 to the second chamber 204. The float 222 of the float assembly 220 at least partially surrounds (e.g., completely surrounds in FIG. 5a) the outlet channel 240, and the plug connecting member 232 is extended through the outlet channel 240, through the divider 700, and is secured to the plug 230. As such, the float assembly 220 (e.g., the float 222, the plug connecting member 232, and the plug 230) may move with respect to outlet channel 240. In one embodiment, the outlet channel 240 may have float guides 242, such that as the float assembly 220 moves with respect to the outlet channel 240, the float 222 will not bind, become caught, or jammed with the outlet channel 240. After assembly, the float assembly 220 is operatively coupled to the divider 700, such that the divider 700 and float assembly 220 may be installed and removed together for replacement, cleaning, and/or adjustment, as necessary, and as described in further detail below. In this embodiment the float 222 may be sized and/or weighted to create a seal between the plug 230 and the seal seat 804 when the float 222 is not buoyant within the liquid sulfur in the first chamber 202.

FIGS. 6-11 illustrate different embodiments of the divider 700 and the associating sealing member 800 (e.g., sealing plate) of the sulfur trap 200. As illustrated by FIGS. 6 and 7, in one embodiment the divider 700 is a separator plate with an orifice 702 therethrough. The orifice may be octagonal, square, rectangular, circular, oval, or other like orifice 702. The divider 700 in FIGS. 6 and 7 is a separator plate that is operatively coupled (e.g., using bolts) to the sealing member 800. The sealing member 800 in some embodiments comprises a seal orifice 802 therethrough. In some embodiments of the invention, the seal orifice 802 has a seal seat 804, such as a conical seal seat. As described in further detail later, a conical seal seat 804 and/or hemispherical surface 522 on the plug 230 may reduce the seal irregularity issues, reduce the unseating force, and improve the seal capabilities. In other embodiments of the invention the seal seat 804 may be a sharp-edged corner (e.g., a ninety-degree corner), beveled corner, rounded corner, or other like sealing seat 804.

FIGS. 8 and 9, illustrate another embodiment of the divider 700, in which the sealing member 800 is formed integrally with the divider 700. FIGS. 10 and 11 illustrate another embodiment of the invention, wherein the sealing member 800 is a cylindrical member that is operatively coupled to the divider 700 (e.g., welded). The cylindrical member extends above the top surface of the divider 700, such that in the event that any debris makes it into the second chamber 204, the debris will accumulate on the top surface of the divider 700 and not within the seal orifice 802 or the sealing surface 804 (e.g., conical sealing surface).

In some embodiments of the invention, the divider 700 comprises one or more assembly mounts 710, such as handles, that allow for removal or assembly of the divider 700 and float assembly 220 within the sulfur trap 200. In this way, a user may utilize the assembly mounts after removing the top (not illustrated) of the sulfur trap 200 in order to assemble and disassemble the divider 700 and float assembly 220 within the sulfur tap 200. As illustrated in FIGS. 2, and 6 through 11, the divider 700 may comprise divider mounting apertures 704 that are used to secure the divider 700 to a mounting ring 250 with mounting apertures 252. The mounting aperture 252 may be threaded to receive bolts through the divider mounting apertures 704. In some embodiments a seal ring (not illustrated) may be located between the divider 700 and the mounting ring 250. In other embodiments of the invention divider 700 may be operatively coupled (e.g., removeably or permanently coupled) to the sulfur trap 200 in order to separate the sulfur trap 200 into a first chamber 202 and second chamber 204. In the instances where the divider 700 is permanently coupled within the sulfur trap 200, a portion of the divider may be removable in order to access and/or remove portions of the divider 700, sealing member 800, and/or float assembly 220.

In some embodiments, when fasteners are used for the divider 700 and/or the sealing member 800, caps may be used to prevent any of the liquid sulfur from leaking through the mounting apertures 704 in the divider 700 and/or the apertures in the sealing member 800. In some embodiments, the caps may be welded to the divider 700, or otherwise coupled to the divider 700 through another means that provides an air or water tight seal.

In some embodiments of the invention, the sulfur trap 200 may also have additional access ports 260, as illustrated in FIG. 2. The access ports 260 are sealed such that no liquid sulfur or gas can escape the sulfur trap 200 during operation, but are configured to open to allow a user to access the sulfur trap 200 for cleaning, repair of the components, or replacement of the components, or bypassing of the sulfur trap 200 if the sulfur trap 200 is not functioning properly. In some embodiments of the invention, the access ports 260 may be covered and sealed through the use of a lid that is at least partially see-through, and thus, allows a user to view the components of the sulfur trap 200, as described below.

Furthermore, in some embodiments of the invention the sulfur trap 200 may also comprise viewing ports 262, such as windows. Typically, individuals at a facility may have to access the piping or access to an in-line viewing apparatus to view the amount of liquid sulfur flowing from the sulfur trap 200 to a storage tank. Accessing either the piping and/or the storage tank may expose the individual and the environment to potentially harmful liquid or gases. In some embodiments of the invention the sulfur trap 200 may include a viewing port 262 in the wall of the sulfur trap 200 to allow a user to view the contents of the first chamber 202 and second chamber 204 in order to determine if the sulfur trap 200 is operating properly. Due to the high temperatures involved in the sulfur trap 200, the viewing ports 262 may become obstructed with condensed sulfur. In some embodiments of the invention, the viewing ports 262 may be located on the wall of the sulfur trap 200 such that as liquid enters into the second chamber 204 the liquid sulfur may spray the viewing ports 262 to clear any condensed sulfur from the viewing ports 262.

The sulfur trap 200 may also comprise a drain 280, in some embodiments, which allows a user to drain the contents of the sulfur trap 2300 for cleaning, to check the operation of the components, replace components, or the like.

The sulfur trap 200, in some embodiments may also comprise a vapor equalizer 290, such as hole between the first chamber 202 and the inlet 206. In this way, there is no pressure differential between the first chamber 202 and the inlet, and thus, the liquid-gas mixture is allowed to flow freely into the first chamber 202.

Some of the sulfur traps illustrated herein provide improvements over other traps, in part, because the debris in the liquid-gas mixture is collected on the floor of the sulfur trap, and thus it may be easier to clean the sulfur trap than other traps associated with recovering liquid sulfur. For example, the debris collection in the present invention allows for improved removal of the debris over previous seal leg designs because the sulfur trap 200 does not need to be removed from the ground and supported with a crane, as required in cleaning seal legs. Furthermore, the debris collection in the present invention allows for improved removal of the debris over other types of sulfur traps because in the present invention it is not necessary to routinely access (e.g., once every 12 hours, once a day, once a week, or the like) the sulfur trap 200 and/or upstream piping for cleaning out a screens or filters, as may be required in other sulfur traps or systems. Since debris in the present invention is collected on the floor of the sulfur trap 200 there is no need for a screen or filter element within sulfur trap 200. Therefore, the sulfur trap 200 may not have to be accessed, disassembled, or the like, as often as required by other sulfur traps, in order to clean the debris from a screen or filter. Instead, in some embodiments of the present invention, the floor of the sulfur trap 300 may have a removable portion, access valve, and/or the like such that an individual may easily access the floor portion of the inlet chamber to remove any built up debris that has collected on the floor of the sulfur trap 200.

In operation, the sulfur trap 200 illustrated in FIGS. 2-5b (as well as other embodiments of the sulfur trap disclosed herein) receives a liquid-gas sulfur mixture in the first chamber 202 through an inlet 206 (e.g., inlet pipe), as illustrated by blocks 102 and 104 of FIG. 1. As illustrated by block 106 of FIG. 1, the debris in the liquid-gas mixture will settle to the floor of the sulfur trap 200 as the liquid-gas mixture enters the first chamber 202. As the liquid-gas mixture fills the first chamber 202 from the inlet 206, the float 222, along with the rest of the float assembly 220, rises as it becomes buoyant within the liquid of the liquid-gas mixture filling the first chamber 202, as illustrated by block 108. When the float 222 becomes buoyant the seal created by the plug 230 and the sealing member 800 of the divider 700 (as described in further detail later) is broken, and the liquid within the liquid-gas mixture is allowed to flow upwardly through the orifice 802 and into the second chamber 204, while gas from the liquid-gas mixture is prevented from entering the second chamber 204, as illustrated in block 110 of FIG. 1. In some embodiments the liquid sulfur flows through the float assembly 220, in order to prevent the gas from entering the second chamber 204. The tail gases are prevented from entering the second chamber 204 because during normal operation (e.g., not during an overpressure event) the outlet channel 240 is always submerged within the liquid sulfur (e.g., the inlet opening of the outlet channel 240 is submerged within the liquid sulfur in the first chamber 202). Therefore, in some embodiments during normal operation, the outlet channel 240 is substantially or completely filled with liquid sulfur, and thus, the liquid sulfur in in the outlet channel 240 is located at a higher level than the liquid sulfur in the first chamber 202. Otherwise stated, the liquid sulfur in the first chamber 202 is located above the first end (e.g., inlet opening) of the outlet channel 240, but below the second end (e.g., exit opening) of the outlet chamber 240.

As illustrated by block 112 of FIG. 1, the liquid sulfur that has passed into in the second chamber 204 is allowed to flow out of the second chamber 204 through the use of an outlet 208 (e.g., exit pipe). As discussed in further detail later, this configuration, in which sulfur flows upwards from the first chamber 202 to the second chamber 204, allows for pressure relief within the sulfur trap 200, as illustrated by block 114 in FIG. 1. For example, if an overpressure event occurs, the liquid-gas mixture flowing into the first chamber 202 can break the seal between the plug 230 and the sealing member 800. Therefore, the liquid-gas mixture is allowed to flow through the outlet channel 240 into the second chamber 204 and out of the pipe 208 in the event of an overpressure situation, which prevents the sulfur trap 200 or other upstream component (e.g., condenser, supply piping, or other components in refineries, or other factories) from being damaged during the overpressure situation.

FIGS. 12 and 13 illustrate another embodiment of the sulfur trap 200, in which the liquid sulfur flows in an upward direction. As illustrated in FIGS. 12 and 13 the second chamber 204 is located at least partially within the first chamber 202. In this embodiment of the sulfur trap 200, the float assembly 1220 comprises a float 1222, one or more support rails 1224, one or more moveable rails 1226, a plug 1230, and plug connecting member 1232. As illustrated in this embodiment, the float 1222 is located within the first chamber 202 at a position above the second chamber 204. The float 1222 is operatively coupled to the one or more moveable rails 1226, which are operatively coupled (e.g., located within, surrounding, or the like) to the one or more support rails 1224, such that the float 1222 moves vertically along with the one or more moveable rails 1226, with respect to the one or more support rails 1224. The one or more moveable rails 1224 are operatively coupled to the plug connecting member 1232, which is operatively coupled to the plug 1230.

In the illustrated embodiment, a sealing member 800 is located within the wall of the second chamber 204. As previously discussed the sealing member 800 has a seal orifice 802 and a seal seat 804. The plug 1230 is located within the second chamber 204, and is used to create a seal with the seal seat 804. In the illustrated embodiment the second chamber 204 comprises plug guides 1236 that guide the plug into the seal seat 804. In some embodiments, as previously discussed the float 1222, and the rest of the float assembly 1220 may be sized and weighted to seal the plug 1230 with the seal seat 804 when the float is not buoyant within liquid sulfur. However, in other embodiments of the invention the plug 1230 may have a plug weight 1234, such the seal between the first chamber 202 and second chamber 204 is maintained, at least in part, by the weight of the plug weight 1234. Moreover, in some embodiments the float 1222 may be located within float guides 1242, which as previously discussed help the float 1222 to move with respect to the one or more support rails 1224 without binding, become caught, or jammed within the sulfur trap 200.

A previously described, assembly mounts 1270 may be utilized to allow for cleaning, repair, or replacement of the float assembly 1220, or the components thereof. In the illustrated embodiment the assembly mounts 1270 are operatively coupled to the float 1222. The float assembly 1220 may be accessed through a removable top (not illustrated) of the sulfur trap 200. Furthermore, the second chamber 204 may have an access port 1280 that allows a user to access the plug 1230 and sealing member 800 for cleaning, removal, replacement, or the like.

As previously discussed with respect to FIGS. 2-11, the seal trap 200 of FIGS. 12 and 13 is an upward flowing liquid sulfur trap. In operation, liquid-gas mixture fills the first chamber 202 from the inlet 206. Debris in the liquid-gas mixture accumulates on the floor of the sulfur trap 200. The tail gases rise to the top of the first chamber 202, while the liquid sulfur fills bottom of the first chamber 204. The tail gases may remain in the head space of the piping that delivers the liquid-gas mixture to the inlet 206 and in the top of the first chamber 202. The level of liquid sulfur rises in the first chamber to a location above the second chamber 204, and at least partially surrounds the float 1222, such that as the level of sulfur rises to point that the float 1222 becomes buoyant, the float 1222 rises. As the float 1222 rises, the one or more moving rails 1226, the plug connecting member 1232, and the plug 1230 rise along with the float 1222, such that liquid sulfur enters the second chamber 204 and exits the second chamber through the exit port 208 and is delivered to the liquid sulfur holding tank (not illustrated). As the liquid sulfur level lowers within the first chamber 202, the plug 1230 falls and creates a seal with the seal seat 804. However, the second chamber 202 is at least partially located within the liquid sulfur, and thus, the liquid sulfur continues to cover the seal orifice 802. Therefore, during operation the tail gases will not be able to enter the second chamber 204, unless there is an overpressure event, as previously described. The float assembly 1220 and/or the plug weight 1234 are sized and weighted in order to allow the plug 1230 to rise if an overpressure event occurs in which the force of the pressure of the liquid-gas sulfur mixture exceeds force of the seal created by the weight of the float assembly 1220 and/or the plug weight 1234.

FIGS. 14 and 15 illustrate another embodiment of the sulfur trap 200, in which the sulfur flows in an upward direction through the seal orifice 802. Like sulfur trap 200 in FIGS. 12 and 13, the sulfur trap 200 in this embodiment has a first chamber 202 and a second chamber 204 located at least partially within the first chamber 204. Also, in this embodiment the float assembly 1420 comprises a float 1422, a plug connecting member 1432, and a plug 1430, and the float 1420 is operatively coupled to the plug 1430 through the plug connecting member 1432. However, unlike in FIGS. 12 and 13, the float 1422 is located at least partially around the second chamber 204. As illustrated the float 1422 may be split into two floats 1422 that are located on opposed sides of the second chamber 204. In other embodiments, the float may be a single float 1422. Furthermore, as is the case with the sealing member 800 in FIGS. 12 and 13, the sealing member 800 in FIG. 14 is located integrally with the second chamber 204. In operation, the sulfur trap 200 illustrated in FIGS. 14 and 15, operates as previously discussed with respect to the sulfur traps 200 discussed with respect to FIGS. 1-11 and 12-13.

FIG. 16 illustrates a cross-sectional view of another embodiment of the sulfur trap 200. The sulfur trap 200, in this embodiment, comprises a first chamber 202 and a second chamber 204 located within the first chamber 202. In this embodiment the float 1622 is a single float 1622 that is located within the first chamber 202 and is adjacent the second chamber 204. The float 1622 is operatively coupled to a plug connecting member 1632 that is operatively coupled to a plug 1630. As previously discussed with respect to the sulfur traps 200 illustrated in FIGS. 2-15, in this embodiment the liquid-gas mixture may enter the first chamber 202 via the inlet 206. The liquid-gas mixture to fills the first chamber 202, and any debris that is in the liquid-gas mixture settles on the floor of the sulfur trap 200 through gravity. As previously discussed with respect to FIGS. 2-15 the second chamber 204 is separated from the first chamber 202 through the use of a divider 700 and/or sealing member 800. In some embodiments, the plug connecting member 1632 may be operatively coupled to the sulfur trap 200, such that the movement of the float 1622 is restricted within the sulfur trap to prevent the float 1622 from being damaged, jammed, binded, stuck, or the like, within the sulfur trap 200. In the embodiment illustrated in FIG. 16 the plug connecting member 1632 is pinned within the sulfur trap 200. In other embodiments the plug connecting member 1632 may have upper and lower limit stops to fix the travel distance of the float 1622, plug 1630, and/or plug connecting member 1632. In some embodiments, the travel distance of the plug 1630 may be limited to twice the diameter of the seal orifice 802.

The sulfur trap 200 may have other configurations in other embodiments of the invention. In some embodiments, as illustrated in FIG. 17, the sulfur trap 200 may have an outlet located directly on the side wall of the first chamber 202, with a weight 1734 that is operatively coupled to the plug 1730 through a plug coupling member 1732. The plug 1730 may be located on the outside of the first chamber 202, or alternatively, it may be located on the inside of the first chamber 202 (not illustrated). As illustrated in FIG. 18 a spring 1850 may be used in place of a weight to seal the first chamber 202. The spring configuration may be located outside of the wall of the first chamber 202. In other embodiments of the invention, as illustrated in FIG. 19, the spring 1950 may take the place of the weight, and also be located within a second chamber 204 that allows the liquid sulfur to exit the sulfur trap 200. The spring 1950 helps to create the seal between the first chamber 202 and the second chamber 204. In still other embodiments of the invention, as illustrated in FIG. 20, the float 1630 may be located generally above the second chamber 204, and thus, the plug coupling member 1632 may be operatively coupled to the plug 1630 through the top wall (as illustrated), or side wall (not illustrated) with a sealing mechanism 1670 preventing liquid sulfur and gas from entering the second chamber 204 though the location of the sealing mechanism 1670. FIG. 21, illustrates another embodiment of the float assembly 1620, in which the float 1622 is located at least partially around the second chamber 204. In this configuration the second chamber 204 acts as a guide for allowing the float 1622 to seal and unseal the plug 1630 and seal seat 804 through the use of the plug coupling member 1632 that is operatively coupled to the plug 1630.

In some embodiments of the invention the seal seat has been illustrated as a conical seal seat. However, it should be understood that the seal seat may be an o-ring, a flat surface, concave surface, convex surface, ridged surface, or another type of sealing surface. The sealing material of the plug 230 and seal seat 804 allows for a releasable seal between these two components.

The sulfur traps 200 illustrated in FIGS. 1-22, all relate to upward or sideways flowing sulfur that allows for debris from the liquid sulfur to collect in the bottom of the sulfur trap 200, as well as for pressure relief during an overpressure event. In alternative embodiments of the invention, the liquid sulfur is configured such that as the liquid sulfur level rises, the float rises and the liquid sulfur exits the sulfur trap by flowing through an orifice in a downward direction.

FIG. 22 illustrates a liquid-gas sulfur separation process 150 for separating liquid sulfur from tail gases using a sulfur trap 200, in accordance with one embodiment of the invention. The liquid-gas sulfur separation process 150 is described in further detail herein with respect to the other drawings, but generally the liquid-gas mixture is received in the sulfur trap through an inlet, as illustrated by block 152. As illustrated by block 154, the liquid-gas mixture received at the inlet is directed into a receiving chamber. In some embodiments, after the receiving chamber, the liquid-gas mixture is directed through a filter to remove debris from the liquid-gas sulfur mixture, as illustrated by block 156. As illustrated by block 158, after filtering the liquid-gas mixture is directed to a first chamber. As the liquid-gas sulfur mixture rises within the first chamber, the float of the float assembly also rise, which then breaks the seal between the plug and the seal seat, as illustrated by block 160. After the seal between the plug and seal seat is broken, a seal orifice is created, which allows the liquid sulfur to flow downwardly through the seal orifice and into the second chamber which is located within or below the first chamber, as illustrated by block 162. The liquid sulfur flows out of the second chamber and out of the sulfur trap through the outlet, as illustrated by bock 164.

FIG. 23 illustrates a cross-sectional view of a sulfur trap 1300, in which liquid sulfur flows downwardly out of the sulfur trap as the float rises, but also has a pressure relief system. The sulfur trap 1300, in this embodiment, comprises one or more input pipe(s) 1302 located on the upper portion of the sulfur trap wall at which the liquid-gas mixture enters the sulfur trap 1300. The liquid-gas mixture, upon entering the sulfur trap 1300, enters into a receiving chamber 1316. The receiving chamber 1316 is located within the sulfur trap 1300 between the outer wall of the sulfur trap 1300 and a baffle 1304. The baffle 1304 is positioned such that it extends downward (e.g., vertically or substantially vertically) from the ceiling of the sulfur trap 1300. In this way, any liquid-gas mixture that may be received into the sulfur trap 1300 via an input pipe 1302, located on the side or ceiling of the sulfur trap 1300, may be initially located in the receiving chamber 1316. Furthermore, the baffles 1304 may be in the shape of a cylinder, and as such any liquid-gas mixture that may enter the sulfur trap 1300 from any side of the sulfur trap 1300 may be directed downward by the baffles 1304 and be directed into the receiving chamber 1316.

In some embodiments, the baffles 1304 may separate at least a portion of the receiving chamber 1316 and a first chamber 302, which is illustrated and described in this embodiment as a ballast chamber 1318. The baffles 1304 may not extend vertically from the ceiling of the sulfur trap 1300 all the way to the floor of the sulfur trap 1300. Instead the baffles 1304 provide for a space between the baffles 1304 and the floor of the sulfur trap 1300. In this way, there is a space located at the bottom portion of the sulfur trap 1300 between the receiving chamber 1316 and the ballast chamber 1318.

Because the liquid-gas mixture is gravitationally pushed towards the lower portion of the receiving chamber 1316 towards the space created by the baffle 1304, the liquid-gas mixture is able to transfer from the receiving chamber 1316 to the ballast chamber 1318. Since the liquid-gas mixture is gravitationally pushed towards the lower portion of the receiving chamber 1316, the debris 1306 (e.g., particles in the liquid) in the liquid-gas mixture that have a density greater than the density of the liquid may settle at the bottom portion of the sulfur trap 1300. In this way, the lower portion of the receiving chamber 1316 may collect debris 1306 and other particles on the floor of the sulfur trap. If the debris 1306 is not filtered out of the process prior to the liquid-gas mixture entering the sulfur trap 1300, the debris 1306 may be collected on the floor of the sulfur trap 1300 based on the gravitational pull on the debris having densities greater than that of the liquid sulfur. The debris 1306 located at the floor of the sulfur trap 1300 may be periodically cleaned out via flushing of the system, removal of a floor tray, and/or accessing the floor of the sulfur trap 1300 via a valve, port, top of the sulfur trap, or the like access point through the sulfur trap 1300.

Since the debris 1306 is collected on the floor of the sulfur trap 1300 it may be easier to clean the sulfur trap 1300 of the present invention than other devices associated with separating liquid sulfur from tail gases. For example, the debris collection in the present invention allows for improved removal of the debris over seal leg designs because the sulfur trap 1300 does not need to be removed from the ground and supported with a crane, as required when cleaning seal legs. Furthermore, the debris collection in the present invention allows for improved removal of the debris over other types of sulfur traps that utilize a filter mesh screening element within the sulfur trap because it is not necessary to routinely access (e.g., once a week, once a month, or the like) the sulfur trap and clean out the screening element. Since the debris 1306 in the present invention is collected on the floor of the sulfur trap 1300 there may be no need for a screening element, such as mesh or the like, to be positioned inside the sulfur trap 1300. Therefore, the sulfur trap 1300 may not have to be accessed, disassembled, or the like as often as required by traditional sulfur traps, in order to clean the debris 1306 from a screening element. Instead, in some embodiments, the floor of the sulfur trap 1300 may have a removable portion, access valve, port, and/or the like such that an individual may easily access the floor portion of the receiving chamber 1316 to remove any built up debris 1306 that has collected.

The ballast chamber 1318 may be located in the upper center portion of the sulfur trap 300 between the baffles 1304. The ballast chamber 1318 may comprise the ballast 1312 (e.g., float), such that when the ballast chamber 1318 fills with the liquid-gas mixture, the sulfur liquid may cause the ballast 1312 to rise. Use of the ballast 1312 in the present invention may be synonymous herein with use of the term float.

The ballast 1312, in some embodiments, is manufactured such that when in combination with the sealing plug 1308 it is buoyant with respect to the liquid sulfur associated with the liquid-gas mixture in the ballast chamber 1318. In this way, in some embodiments, the combination of the ballast 1312 and sealing plug 1308 are less dense than the liquid sulfur, such that the combination of the ballast 1312 and the sealing plug 1308 may float within the liquid sulfur in the ballast chamber 1318 when the liquid sulfur reaches a desired level.

The ballast 1312 may be operatively coupled to a sealing plug 1308, such that when the ballast 1312 raises within the liquid sulfur, so does the sealing plug 1308. In some embodiments, the ballast 1312 is cylindrical in shape, as illustrated in FIG. 23. In other embodiments, the ballast 1312 has other shapes as illustrated or described herein, or the like. In yet other embodiments, the ballast 1312 may take any shape as long as it, in combination with the sealing plug 1308, is buoyant with respect to the liquid sulfur that enters the sulfur trap 1300. In some embodiments of the invention the ballast 1312 may be large enough, such that it is held in the proper orientation within the ballast chamber 1318. In other embodiments the ballast 1312 may comprise other means for keeping it in the proper orientation within the ballast chamber 1318, such as ballast guides 1313, which may include but are not limited to rods, tracks, guides, or the like.

As described above, the ballast 1312 is in direct connection with a sealing plug 1308. In the embodiment illustrated in FIG. 23 the sealing plug 1308 is hemispherical plug 1308. The sealing plug 1308 may take the form of a verity of shapes and/or sizes depending on the application. The sealing plug 1308 is in direct contact with a sealing seat 1310 when the ballast 1312 is not floating with respect to the level of liquid sulfur in the ballast chamber 1318. In this way, the contact (e.g., engagement) of the sealing plug 1308 with the sealing seat 1310 creates an airtight seal when fully engaged, such that liquid-gas may not pass through a flow orifice 1320 into a seal chamber 1314 until the ballast 1312 is lifted.

The sulfur trap 1300 further comprises a second chamber 204, which in this embodiment is described as a seal chamber 1314. The seal chamber 1314, in this embodiment is located directly below at least a portion of the ballast chamber 1318. In this way, liquid sulfur may be able to flow from the ballast chamber 1318 downward into the seal chamber 1314 using gravity. While both the receiving chamber 1316 and the ballast chamber 1318 may have the liquid-gas mixture in them, the seal chamber 1314 is designed such that only liquid sulfur may flow into the seal chamber 1314. Therefore, the ballast 1312 is designed such that the seal is maintained between the sealing plug 1308 and sealing seat 1310 at all times unless the liquid sulfur level is high enough to cover sealing interface between the sealing plug 1308 and the sealing seat 1310 and lift the ballast 1312 to break the seal.

The seal chamber 1314 is defined by the floor of the sulfur trap 1300 as well as a cylindrical baffle 1324 that extends upward from the floor of the sulfur trap 1300 to define the sides of the seal chamber 1314. In other embodiments of the invention, the cylindrical baffle 1324 may be of any type of shape in order to create a seal chamber 1314. In some embodiments the seal chamber 1314 extends upwards from the floor of the sulfur trap 1300 to a location past the lowest portion of the baffles 1304 of the receiving chamber 1316. The upper portion of the seal chamber 1314 has a means for attaching a sealing seat 1310 thereto.

The sealing seat 1310, described in further detail herein, seals the ballast chamber 1318 from the seal chamber 1314. The sealing seat 1310, in some embodiments, may be comprised of metal, rubber, teflon, or the like. In other embodiments, the sealing seat 1310 may be comprised of any material that may not corrode from the liquid-gas mixture and may also provide a seal to keep the liquid-gas mixture and/or liquid sulfur out of the seal chamber 1314. In some embodiments, the sealing seat 1310 is circular in shape. The sealing seat 1310 may also be any shape in which it is able to cover the upper portion of the seal chamber 1314. In this way, if the upper portion of the seal chamber 1314 is rectangular in shape, the sealing seat 1310 may be rectangular as well, such that the seal seat 1310 covers the entire upper opening of the seal chamber 1314.

The sealing seat 1310 comprises a flow orifice 1320. The flow orifice 1320 (e.g., seal orifice) allows for liquid sulfur to flow from the ballast chamber 1318 to the seal chamber 1314, through the sealing seat 1310. The diameter of the flow orifice 1320 matches the diameter of the upper portion of the sealing plug 1308. In this way, as described above, when the sealing plug 1308 is resting on the sealing seat 1310, the sealing plug 1308 and the sealing seat 1310 create an airtight seal, such that liquid-gas may not pass through the flow orifice 1320 into the seal chamber 1314.

In some embodiments, since the ballast 1312 is connected to the sealing plug 1308, the ballast 1312 may control the movement of the sealing plug 1308 away from the sealing seat 1310. As such, when the ballast 1312 receives enough force from the liquid sulfur filing the ballast chamber 1318, the ballast 1312 may pull the sealing plug 1308 out of its seal with the sealing seat 1310. The forces required to pull the sealing plug 1308 out of the sealing seat 1310 may be more than the forces required to lift the ballast 1312. As such, additional force may be required to be exerted on the ballast 1312 from the liquid sulfur in order to push the ballast 1312 upward. In this way, in some embodiments the initial unsealing of the sealing plug 1308 and the sealing seat 1310 may create a bobbing effect on the ballast 1312 when the seal is first broken.

Once the seal is broken, liquid sulfur flows from the ballast chamber 1318 to the seal chamber 1314 through the flow orifice 1320. Once the liquid sulfur has reached the seal chamber 1314 it is directed out an output pipe 1322 (e.g., outlet) and on to a storage tank. In some embodiments, the output pipe 1322 is located on the floor of the sulfur trap 1300 or on the wall of the sulfur trap 1300 near the floor, such that gravity may direct the liquid sulfur into the output pipe 1322.

In some embodiments, a pressure event upstream of the sulfur trap 1300 may exceed the limitations for which the system was designed. In these circumstances, a pressure relief system comprising a pressure back-up valve 1350, located for example on the ceiling or top of the sulfur trap 1300, may be utilized to relieve the pressure from the sulfur trap 1300. The pressure relief system comprises a pressure back-up valve 1350 and a pressure relief pipe 1352, however, in other embodiments of the invention the pressure relief system may comprise pressure relief configurations other than a valve 1350, such as a weighted plug and seal pressure relief valve.

The pressure back-up valve 1350 may be located on the ceiling of the sulfur trap 1300, within the ballast chamber 1318, or within the receiving chamber 1316, such as on a wall of the ballast chamber 1318 or receiving chamber 1316. Upon the occurrence of an abnormal amount of pressure (e.g., more than 15 psi) in the sulfur trap 1300, the pressure back-up valve 1350 unseals from the ceiling of the sulfur trap 1300. The pressure back-up valve 1350 may release and allow the liquid-gas mixture into the pressure relief pipe 1352 upon sensing abnormal amounts of pressure. The abnormal amounts of pressure may be measured via several means, including, but not limited to a pressure sensor, weight sensor, spring sensor, manually, and/or other sensing device that may open the pressure relief pipe upon an abnormal amount of pressure being in the sulfur trap 1300. Once the pressure back-up valve 1350 releases the seal with the ceiling of the sulfur trap 1300, the liquid-gas may pass through the pressure relief pipe 1352 and enter into the exit housing 1360.

In some embodiments of the invention, after the exit housing 1360 and output pipe 1322 there may be one or more sulfur traps, valves, and/or release ports to remove liquid sulfur from the liquid-gas mixture prior to the liquid-gas mixture reaching the storage tank. In this way, the liquid-gas mixture may not be combined with the liquid sulfur that is already stored in the downstream storage tank.

Furthermore, as illustrated in FIGS. 24a and 24b, the sulfur trap 1300 may be configured such that the seal chamber 1314 allows the liquid sulfur to exit the sulfur trap 1300 either vertically out of the bottom of the sulfur trap, as illustrated in FIG. 24a, or otherwise horizontally out of the side wall of the sulfur trap, as illustrated in FIG. 24b.

FIG. 25 illustrates a cross-sectional view of a sulfur trap 2200 with a first chamber 2202, an exit tube 2204 located within the first chamber 2202, and a sealing device 2210 that creates an air and liquid tight seal between the chamber 2202 and the exit tube 2204. In some embodiments of the invention the exit tube 2204 may be a tube, or some other member with an aperture therethrough (e.g. exit member), that is located within the first chamber 2202. The exit tube 2204 may have a circular, square, rectangular, pentagonal, or any other shape, which allows the liquid sulfur to pass therethrough.

In some embodiments of the invention the first chamber 2202 may be a single first chamber 2202, wherein the receiving chamber 1316 and the ballast chamber 1318 from previous embodiments described above, have been combined into a single first chamber 2202, and the seal chamber 1314 from previous embodiments does not exist. However, in other embodiments, the sulfur trap 2200 may still comprise a receiving chamber 1316 that is separated from a first chamber 2202 through the use of a baffle 2230, as illustrated FIGS. 25 and 26. In some embodiments the baffle 2230 is used to direct the flow of the liquid sulfur through a basket strainer 2240, which is described with respect to other embodiments of the invention as a filter or screen that is used to remove debris from the liquid sulfur. The baffle 2230 may include baffle apertures (not illustrated) which allow for pressure equalization between the chamber 2202 and the receiving chamber 1316, but still prevents a majority of the liquid sulfur from entering the first chamber 2202 without first passing through the basket strainer 2240. During normal operation, the liquid sulfur passes through the strainer basket 2240, however, in some embodiments (i.e., during the occurrence of increased pressure), some liquid sulfur may pass through an aperture in the baffle 2230.

The sealing device 2210 illustrated in FIGS. 25 and 26, may have sealing components like the sealing components previously described throughout the various embodiments of this invention. The sealing device 2210 may comprise a float 2212 (i.e., ballast) that is operatively coupled to a sealing plug 2214. A divider 2216 may be located at the inlet of the exit tube 2204 to operatively couple the sealing device 2210 to the exit tube 2204, and thus, allow for the separation of the liquid sulfur from the tail gases located in the first chamber 2202. The sealing plug 2214 may interact directly with the divider 2216 to create a seal between the exit tube 2204 and the chamber 2202, or in other embodiments a sealing seat 2218, operatively coupled to the divider 2216, may be used to create the seal with the sealing plug 2214. As previously described herein, the sealing plug 2214 may be any type of shape, but as illustrated in FIG. 25 the sealing plug 2214 is a conical shape.

The float 2212 illustrated in FIG. 25, is surrounded by a float cover 2220, which aligns the float 2212, and thus, the sealing plug 2214 in the proper location to create a seal. In some embodiments, without the float cover 2220 the float 2212 and the sealing plug 2214 could become misaligned, which could prevent the creation of a proper seal between the chamber 2202 and the exit tube 2204. In some embodiments the float 2212 and the sealing plug 2214 are designed to achieve the proper alignment for sealing without the use of the float cover 2220 illustrated in FIGS. 25 and 26. For example, in some embodiments, the float 2212 may be as wide as the first chamber 2202 walls. In still other embodiments, the float cover 2220 may only have side walls and no top. In other embodiments, the float 2212 may be aligned on a track or other member within the first chamber 2202. It should be understood that the various alignments devices described herein, and like devices not specifically described herein, may be collectively referred to as seal alignment devices, float guides, float alignment guides, or the like. In some embodiments the float cover 2220, or other alignment devices, may be a housing with apertures (not illustrated) therethrough that allow the liquid sulfur to pass through the float cover 2220 (or other alignment devices). The liquid sulfur in the chamber 2202 raises the float 2212 and breaks the seal between the sealing plug 2214 and the seat 2218, and thus, only allows the liquid sulfur to flow into the exit tube 2204 while the tail gases remain within the first chamber 2202.

In operation, the sulfur trap 2200 illustrated in FIGS. 25 and 26, receives liquid sulfur and tail gas from the inlet 1302 in the receiving chamber 1316. The tail gas may diffuse through the apertures in the baffle 2230, while the liquid sulfur passes through the strainer basket 2240 to remove any debris from the liquid sulfur. Any small particles not caught by the strainer basket 2240 may collect in the bottom floor of the first chamber 2202. As the level of liquid sulfur rises in the first chamber 2202, the float 2212 rises and the seal is broken between the sealing plug 2214 and the sealing seat 2216, which allows the liquid sulfur to pass through the exit tube 2204 without allowing the tail gases located in the first chamber 2202 to pass into the exit tube 2204. When the level of the liquid sulfur is reduced, the float 2212, which is guided by the float cover 2220, lowers and the sealing plug 2214 reseals with the sealing seat 2216.

In some embodiments of the invention the sulfur trap 2200 also includes a davit arm 2260 which may be used to lift and rotate the top 2262 of the sulfur trap 2200 to allow a user access to the inside of the sulfur trap 2200 for cleaning, to check the operation of the components, replacement components, or the like. For example, with the top 2262 removed, a user can remove the strainer basket 2240 in order to remove the collected debris from the strainer basket 2240, as well as reach any debris that may have passed through the strainer basket 2240 and settled on the floor of the chamber 2202. Furthermore, in other embodiments of the invention the bottom 2264 of the sulfur trap 2200 may also be removable to allow for cleaning or replacement.

As with the other embodiments of the invention described herein, the sulfur trap 2200 illustrated in FIGS. 25 and 26, may also comprise a valve 2250 (i.e., pressure relief valve 1350), or other device, that releases in the event of the occurrence of overpressure in the system to which the sulfur trap is connected. The sulfur trap 2200 may also comprise a drain 2280, in some embodiments, which allows a user to drain the contents of the sulfur trap 2200 for cleaning, to check the operation of the components, replace components, or the like.

Another embodiment of the sulfur trap 300 is illustrated in FIGS. 27-43. FIG. 27 illustrates a cross-sectional view of one embodiment of the sulfur trap 300. The sulfur trap 300, in this embodiment, comprises one or more input pipe(s) 302 located on the upper portion of the sulfur trap wall. In other embodiments, the one or more inlet pipe(s) 302 may be located at a lower portion of the sulfur trap wall. In yet other embodiments, the one or more inlet pipe(s) 302 may be located in any portion of the sulfur trap wall, or in the ceiling or top lid 900 of the sulfur trap 300. In some embodiments, the liquid-gas mixture may enter the receiving chamber 316 of the sulfur trap 300 via one inlet pipe located on the side wall of the sulfur trap 300. In other embodiments, the liquid-gas mixture may enter the receiving chamber 316 of the sulfur trap 300 via multiple inlet pipes located on the side wall of the sulfur trap 300.

The liquid-gas mixture, upon entering the sulfur trap 300, enters into a receiving chamber 316. In this embodiment, the receiving chamber 316 is located within the sulfur trap 300 above the ballast chamber 318 (e.g., first chamber). The receiving chamber 316 is separated from the ballast chamber 318 by a debris separator, such as a basket assembly 600 or other like screen or filter. The debris separator, such as the basket assembly 600, is used to separate debris from the liquid-gas mixture. One embodiment of the basket assembly 600 is illustrated in FIGS. 39 and 40. The basket assembly 600 may include a mesh wall 602, one or more basket projections 604, and a basket handle 606. In some embodiments, the mesh wall 602, or other like wall surface (e.g., wall with holes, or the like), separates the debris from the liquid-gas mixture. In some embodiments, the mesh wall 602 has a coarse meshing to only remove larger particles from the liquid-gas mixture. In other embodiments, the mesh wall 602 has a fine meshing to remove larger and smaller particles from the liquid-vapor mixture.

In some embodiments of the invention, the basket projection 604 of the basket assembly 600 rests upon one or more trap protrusions 330 extending from the inner surface of the sulfur trap wall 320. In some embodiments, the trap protrusions 330 (e.g., mounting ring) may extend around the entire inner surface of sulfur trap 300. In some embodiments, a seal is provided between the basket assembly 600 (e.g., the basket projection 604, or the like) and the trap protrusion 330, or the basket assembly 600 is otherwise secured between the receiving chamber 316 and the ballast chamber 318, such that any liquid-gas mixture passing from the receiving chamber 316 to the ballast chamber 318 is forced to pass through the basket assembly 600 for filtering the liquid-gas mixture.

The basket assembly 600 may be secured within the sulfur trap by the top lid 900. In some embodiments, the basket assembly 600 may include a basket handle 606 or other feature on the basket assembly 600 that receives a force from the top lid 900 when the top lid 900 of the sulfur trap 300 is being closed or is closed. The force from the top lid 900 presses the basket assembly 600 against the trap protrusions 330, or other like sealing mechanism, of the sulfur trap 300 to secure and/or seal basket assembly 600 within the sulfur trap 300. In other embodiments of the invention the basket assembly 600 maybe secured by other means, such as for example a keyed construction, clips, fasteners, or the like.

The basket assembly 600 is configured, in some embodiments through the use of the basket handle 606, for removal from the sulfur trap 300 in order to remove the debris collected from filtering the liquid-gas mixture through the basket assembly 600. In some embodiments the basket assembly 600 may be located totally within the receiving chamber 316, partially within the receiving chamber 316 and partially within the ballast chamber 318, or completely within the ballast chamber 318.

The ballast chamber 318, as illustrated in FIG. 27, is located below the receiving chamber 316 and above the seal chamber 314 (e.g., second chamber). The ballast chamber 318, in some embodiments is separated from the seal chamber 314 through the use of a separator plate 700 (e.g., divider), which is illustrated in FIGS. 30 and 31. The separator plate 700, in some embodiments is a circular plate with an octagonal, square, rectangular, circular, oval, or other like orifice 702 therethrough. The separator plate 700 is secured within the sulfur trap by welding, fasteners, or other like mechanism that creates a liquid tight seal (except for the orifice). In some embodiments the seal plate 800 (e.g., sealing member) may be formed integrally with the separator plate 700.

In some embodiments the separator plate 700 is configured for operative coupling to a seal plate 800. The separator plate 700, in some embodiments may receive the seal plate 800 on a top surface or bottom surface of the separator plate 700. In some embodiments, as is the case in the illustrated embodiment in FIGS. 27, 31, and 33, the separator plate 700 has a recessed surface 704 that receives the seal plate 800. The separator plate 700 may be operatively coupled to the seal plate 800 through the use of fasteners (e.g., screws, bolts, rivets, or the like), welded, epoxy, or the like. When fasteners are used, in some embodiments, caps 706 may be used to prevent any of the liquid sulfur from leaking through the fasteners holes in the separator plate 700 and/or seal plate 800. In some embodiments, the caps 706 may be welded to the separator plate 700, or otherwise operatively coupled to the separator plate 700 through another means.

The seal plate 800, as illustrated in FIGS. 32 and 33, has a seal orifice 802 therethrough. In some embodiments of the invention, the seal orifice 802 has a conical seal seat 804. As described in herein, a conical seal seat 804 and/or hemispherical surface 522 on a sealing plug 520 may reduce the seal irregularity, reduce the unseating force, and improve the seal capabilities. In some embodiments of the invention the seal plate 800 may also have a debris wall 806, as illustrated in FIGS. 27, 37, and 38. The debris wall 806, in some embodiments, may be angled outwardly to help prevent debris that has passed through the basket assembly 600 from entering the seal orifice 802 or becoming lodged or stuck between the conical seal seat 804 and seal plug 520, as described in further detail later.

An insert assembly 400 and a ballast assembly 500, which is configured to be located within the inset assembly 400 (e.g., collectively also described herein as a float assembly), are both located within the ballast chamber 318. The insert assembly 400, in some embodiments, as illustrated in FIGS. 28 and 29 comprises an insert wall 402 and a seal alignment device, such as a ballast guide 404 that guides the ballast to properly create a seal between the plug 520 and the sealing seat, such as the conical sealing seat 804. The insert wall 402, like the basket wall 602, may be a mesh wall or other like surface that allows the liquid-gas mixture to pass through the insert wall 402. The ballast guides 404 are secured to the insert wall 402 in order to provide a guide within which the ballast assembly 500 may move vertically with respect to the ballast guides 404. In some embodiments the seal alignment device (e.g., the one or more ballast guides 404, or the like) provides point contact with the ballast assembly 500, such that in this way debris that may pass through the basket assembly 600 is not as easily lodged or stuck between the ballast assembly 500 and the seal alignment device. If debris becomes stuck between the ballast assembly 500 and the seal alignment device, the ballast assembly 500 could be prevented from floating properly within the ballast chamber 318 to seal and unseal the seal chamber 314 during operation. For example, in one embodiment the seal alignment device is a guide 404 that comprises two or more guide bars 406 (e.g., four guide bars as illustrated). The guide bars 406 are located vertically within the insert wall 402, such that they surround the ballast assembly 500 when the ballast assembly 500 is installed within the insert assembly 400. The guide bars 406, and other seal alignment devices in other embodiments, may only contact the ballast assembly 500 at single locations such that in this way it is difficult for debris to get caught between the guide bars 406 and the ballast assembly 500. In other configurations if the ballast guides 404, or other seal alignment devices, completely or mostly surround the ballast assembly 500 it may be easier for debris to get stuck and prevent the ballast assembly 500 from moving vertically with respect to the level of liquid sulfur within the ballast chamber 318.

The ballast assembly 500, as illustrated in FIGS. 34 and 35 comprises a ballast 502 (e.g., float) and a plug 520. The ballast 500 is generally an air and liquid tight container that will float in the liquid sulfur. The ballast 502, in some embodiments, is a cylindrical container, filled with air, another gas, a liquid, or otherwise a solid material that floats within a particular amount of liquid sulfur. The lower surface of the ballast 502 is configured for coupling to the plug 520. In some embodiments the plug 520 may be welded, fastened, glued, formed integrally with, or otherwise be operatively coupled, either permanently or releasably, to the ballast 502. The ballast 502, may have a generally flat top, such that when there is enough liquid sulfur for the ballast 502 to float to a position that contacts the bottom of the basket assembly 600, the ballast 502 contacts the basket assembly 600 over the flat top surface of the ballast 502. The contact load between the ballast 502 and the basket assembly 600 is distributed to the basket assembly 600 over the flat top surface of the ballast 502, as opposed to a single point load that would exist in other ballast configurations, such as a sphere, or the like. The flat top of the ballast 502 may prevent damage to the basket assembly 600 and/or the ballast 502, and also reduce the chance of the ballast 502 from dislodging the assembly basket 600 from its installed position.

In some embodiments of the invention the ballast assembly 500 comprises a lifting device 510, such as a loop, handle, lever or other like device, which provides for easy removal of the ballast assembly 500 for cleaning, replacement, access to other components, or the like. In some embodiments, the ballast assembly 500 may be hot and slippery, and thus, it may be difficult to remove the ballast assembly 500 as needed for cleaning, repair, replacement, other access, or the like. The lifting device 510 allows for improved ease of removal of the ballast assembly 500 from the sulfur trap 300.

In some embodiments of the invention the plug 520, as illustrated in FIG. 36, has a hemispherical surface 522. When the liquid sulfur in the ballast chamber 318 is low enough, such that the ballast assembly will not float in the liquid sulfur, the hemispherical surface 522 of the plug 520 sits within the seal seat, such as the conical seal seat 804 of the seal plate 800. The seal between the hemispherical surface 522 and the conical seal seat 804 prevents the liquid-gas mixture of sulfur from passing from the ballast chamber 318 to the seal chamber 314. The hemispherical surface 522 improves the sealing surface area, such that a single line around the hemispherical surface 522 provides the seal between the ballast chamber 318 and the seal chamber 314. The single line seal minimizes the risk of foreign impediments (e.g., debris or the like) or seat irregularity from adversely affecting the sealing integrity. The hemispherical surface 522 of the plug 520 reduces the alignment sensitivity that arises with other sealing configurations. The hemispherical surface 522 on the plug 520 can provide sealing in various orientations. Additionally, the conical seal seat 804 provides a broad target zone for receiving the hemispherical surface 522 of the plug 520. Furthermore, the minimum sealing surface area of the line seal minimizes the force required to unseat the plug and break the seal. The minimum force of unseating results in a gentle rising of the ballast assembly 500. Other types of configurations that have a larger sealing surface area may require a greater force to unseat the plug 520 and break the seal, which could accelerate the ballast assembly 500 upward more quickly. The accelerated upward movement caused by the greater force needed to break a seal with a larger surface area than a line seal may allow gas along with the liquid into the sealing chamber 314, may increase the chance of damage to the basket assembly 500, or may increase the chance of unseating the basket assembly 500.

In the present invention as the liquid gas enters the ballast chamber 318 the liquid in the liquid-gas mixture collects near the bottom of the ballast chamber 318. Any debris that is not collected in the basket assembly 600 is collected near the bottom of the ballast chamber 318. As illustrated in FIGS. 27, 37, and 38, the debris wall 806 around the orifice helps to prevent or reduce the debris at the bottom of the ballast chamber 318 from reaching the seal seat 804 and disrupting the seal between the seal seat 804 and plug 520. As illustrated, the debris wall 806 may be directed outwardly from the base to the top of the debris wall 806. In other embodiments of the invention, the debris wall 806 may be oriented in different positions, such as vertically, inwardly directed, or the like. Furthermore, the debris wall 806 is illustrated as a square configuration, it should be understood that in other embodiments the debris wall 806 may be in the shape of a circle, oval, pentagon, octagon, or other like configuration.

FIGS. 41 and 42 illustrate the top lid 900 of the sulfur trap 300. In some embodiments the top lid 900 is secured to the body of the sulfur trap 300 through the use of a hinge 902 and one or more latches 904. The latches 904 may be quick connect latches that are easily engaged or disengaged to allow for quick access and sealing of the sulfur trap 300. In other embodiments of the invention, the top lid 900 may be secured to the sulfur trap 300 using only latches, or other types of fastening means.

Along with the inlet for the liquid-gas sulfur mixture and the exit for the liquid sulfur, the sulfur trap 300 may also comprise one or more additional ports for bypassing, or accessing the sulfur trap 300. For example, bypass ports may be used in the event of a clog in the filter (e.g., basket assembly 600, or the like) or a clog in the seal orifice 802. The access ports may be used to allow a user to access various internal areas of the sulfur trap 300 for cleaning, repair, replacement, or the like.

The plug has been generally described herein as hemispherical plug, however the plug may take a variety of shapes and/or sizes depending on the application. For example, in other embodiments of the invention, instead of the plug being hemispherical, the plug may have a cone shaped plug, as illustrated by FIG. 43. In some embodiments, the cone shaped body portion is tapered from a thicker upper portion to a point at the bottom. In other embodiments, the cone does not come to a point and instead is rounded or flat. In still other embodiments the plug may be any type of non-linear shape.

As illustrated by FIGS. 24a, 24b, 25, and 43, the plug may be coned shaped. A cone shaped sealing plug 1308 may provide some benefits, such as calculating the flow of liquid sulfur based on the displacement of the sealing plug 1308 and ballast 1312 with respect to the sealing seat 1310. In this way, an individual may be able to determine the amount of liquid sulfur flowing from the sulfur trap 1300 to the storage tank. It may be beneficial for an individual know how much sulfur is flowing out of the sulfur trap 1300. In order to monitor the liquid sulfur exiting the current seal leg traps, an individual may be required to access the piping after the sulfur trap and before the liquid sulfur reaches the storage tank. Accessing either the piping and/or the storage tank may expose the individual and the environment around the individual to potentially harmful liquid sulfur and/or gases.

In the present invention the precise amount of liquid sulfur flowing through the flow orifice 1320 may be calculated based on the displacement distance of the sealing plug 1308, the diameter of the sealing plug 1308 at the sealing seat 1310, and the diameter of the flow orifice 1320 on the sealing seat 1310. The displacement distance of the sealing plug 1308 allows an individual to know the diameter of the sealing plug 1308 at the flow orifice 1320. The displacement distance of the sealing plug 1308 may be determined based on how much vertical movement is associated with the ballast 1312 due to liquid sulfur entering the ballast chamber 1318. When the ballast 1312 moves upward because of the force exerted on it from the liquid sulfur, the displacement distance of that ballast 1312 and/or the top of the sealing plug 1308 from the sealing seat 1310 may be measured. The measurement may be done via a displacement device operatively coupled to the ballast 1312, the sealing plug 1308, to one of the chambers, or elsewhere in the sulfur trap 1300. The displacement device may be a LVDT (Linear Variable Differential Transformer), sensor, meter, visualization device, accelerometer, and/or the like. Based on the displacement distance, the diameter of the sealing plug 1308 at the sealing seat 1310 may be known. For example, the sealing plug 1308, in some embodiments, is an upside down cone shape, such that the diameter of the cone changes as the ballast 1312 is displaced further up into the ballast chamber 1318. In this way, the more liquid sulfur that is in the ballast chamber 1318 the more volume of liquid sulfur that may be displaced through the flow orifice 1320 into the seal chamber 1314. Since the ballast 1312 may not be displaced far enough up into the ballast chamber 1318 a portion of the conical sealing plug 1308 may still be located in the flow orifice 1320. However, because the diameter of the sealing plug 1308 is known at various points along the cone portion of the plug 1308, the diameter of the sealing plug 1308 at the point where it enters the sealing seat 1310 may also be known. Therefore, a determination may be made as to the area of the doughnut shaped opening created between the diameter of the sealing plug 1308 and the diameter of the sealing seat 1310 that creates the flow orifice 1320. These measurements may be used to determine the amount of liquid sulfur flowing through the flow orifice 1320, and thus, the amount of liquid sulfur leaving the sulfur trap 1300 may be calculated. Because the amount of liquid sulfur entering the seal chamber 1314 may be precisely quantifiable there may be no need for downstream periodic checking to determine liquid sulfur flow. In this way, the present system provides additional safety features by eliminating the need for in-line downstream checking of the system to determine if liquid sulfur is flowing out of the seal chamber 1314 to a liquid sulfur storage tank.

Some or all of the internal components of the sulfur traps described herein may be removable for various reasons. Using filtering and/or gravity may help to prevent debris from making its way into other parts of the sulfur trap, but debris may still access and come in contact with the components of the sulfur traps. Also, the liquid sulfur and tail gases may damage some of the components of the sulfur traps. Therefore, it may useful to access the inside of the sulfur trap for cleaning, removal and replacement of components, repair of components, or interchangeability of the components between multiple sulfur traps. Therefore, the internal components of the sulfur trap may be removable to facilitate the cleaning, replacement and repair, or interchangeability between sulfur traps. In some embodiments of the invention alignment pins or dowels may also be used on one or more of the internal components to facilitate the proper assembly of the internal components in the sulfur traps.

In some embodiments of the invention, the sulfur trap described herein may be heated and/or insulated, or otherwise maintained at the desired temperature using temperature control elements. The sulfur trap temperature may be controlled in any number of ways, including, but not limited to, fully jacketing, partially jacketing, or otherwise securing the sulfur trap in a temperature controlled container. With respect to fully jacketing, the sulfur trap may be encapsulated within a shroud or other outer wall that receives a fluid or gas at the desired temperatures (e.g., heated). The fluid or gas received at the desired temperatures keeps the sulfur trap at the desired temperatures for maintaining at least a portion of the sulfur in the liquid sulfur state. With respect to partial jacketing, the sulfur trap may be surrounded, at least partially with a shroud or other outer wall that receives a fluid or gas at elevated temperatures (e.g., heated). For example, in some embodiments the sulfur trap may be partially covered by a tracer lines that are wrapped around at least a portion of the sulfur trap. The tracer lines may be any shape or size, and use any type of liquid or gas for temperature control. Again, the fluid or gas received at the desired temperatures keeps the sulfur trap at the desired temperatures for maintaining at least a portion of the sulfur in the liquid sulfur state. In other embodiments of the invention, other types of temperature control elements may be used such as electric heaters, geothermal heaters, gas heaters, or the like. In one embodiment the sulfur trap may be secured within a container or room, and the temperature of the container or room is controlled by a temperature control element.

The dimensional specifications of the sulfur traps and various components will vary based on the application of the sulfur trap, but in some embodiments of the invention the dimensions will conform to the ranges illustrated in Table 1. However, in other embodiments of the invention the dimensions will be outside of these ranges.

TABLE 1

Potential Parameters of the Sulfur Trap in Accordance with One Embodiment of the Invention

| Component | Minimum | Maximum |
| --- | --- | --- |
| Sulfur Trap OD (inches) | 12 | 32 |
| Float OD (inches) | 6 | 26 |
| Float Height (inches) | 4 | 18 |
| Orifice OD (inches) | 0.5 | 2.75 |
| Inlet/Outlet Nozzle (inches) | 2 | 10 |

In other embodiments of the invention the sulfur trap may be used in other applications where a liquid is being separated from a liquid-gas mixture.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus, comprising:
a first chamber for receiving a liquid sulfur and a gas mixture;
a second chamber located at least partially above the first chamber;
a divider for separating the first chamber from the second chamber;
a float assembly, wherein the float assembly comprises:
a float located within the first chamber;
a plug located within the second chamber;
a plug connecting member operatively coupling the float and the plug;
wherein the float assembly is operatively coupled to the divider to seal and unseal the first chamber from the second chamber;
wherein the liquid sulfur is allowed to flow upwardly from the first chamber into the second chamber and the gas remains in the first chamber when the float assembly and the divider are unsealed while the float is buoyant within the liquid sulfur and the plug is unseated and moved further into the second chamber;
wherein the liquid sulfur and the gas are prevented from entering the second chamber when the float assembly and the divider are sealed while the float lacks buoyancy in the liquid sulfur; and
wherein in response to an over-pressurization event of the first chamber, the plug is unseated and moved further into the second chamber, to unseal the first chamber from the second chamber to allow the gas to escape into the second chamber.

2. The apparatus of claim 1, further comprising:
a sealing member comprising a seal seat with a conical surface;
wherein the sealing member is operatively coupled to the divider;
wherein the plug comprises a hemispherical surface; and
wherein the conical surface of the seal seat and the hemispherical surface of the plug are operatively coupled to seal and unseal the first chamber from the second chamber using a line seal between the conical surface of the seal seat and the hemispherical surface of the plug.

3. The apparatus of claim 1, further comprising:
an outlet channel operatively coupled to the divider and extending into the first chamber;
wherein the outlet channel is at least partially submerged within the liquid sulfur;
wherein a liquid sulfur level within the outlet channel is above a liquid sulfur level within the first chamber; and
wherein the float is located outside of the outlet channel.

4. The apparatus of claim 1, further comprising:
one or more access ports that allow for access for cleaning, replacement, or repair; and
one or move viewing ports.

5. The apparatus of claim 1, further comprising a drain to allow drainage of the liquid sulfur before accessing the apparatus.

6. The apparatus of claim 1, further comprising:
an inlet operatively coupled to the first chamber;
an outlet operatively coupled to the second chamber; and
a vapor equalizer operatively coupled between the first chamber and the inlet configured for equalizing the pressure between the first chamber and the inlet.

7. The apparatus of claim 1, further comprising;
an outlet channel operatively coupled to the divider within the first chamber;
float guides operatively coupled to the outlet channel;
wherein the outlet channel is at least partially submerged within the liquid sulfur; and
wherein the float moves with respect to the float guides and the outlet channel.

8. An apparatus, comprising:
a first chamber for receiving a liquid sulfur and a gas mixture;
a second chamber located at least partially above the first chamber;
a divider for separating the first chamber from the second chamber;
an outlet channel in the first chamber, wherein the outlet channel is operatively coupled to the divider and extends into the first chamber;
a float assembly comprising a float and a plug, wherein the float assembly is operatively coupled to the divider to seal and unseal the first chamber from the second chamber, and wherein the float is located within the first chamber outside of the outlet channel;
wherein an inlet opening of the outlet channel is submerged within the liquid sulfur within the first chamber and the liquid sulfur within the outlet channel substantially fills the outlet channel such that a liquid sulfur level within the outlet channel is above a liquid sulfur level within the first chamber;
wherein the liquid sulfur is allowed to flow upwardly into the second chamber from the outlet channel and the gas remains in the first chamber when the float assembly and the divider are unsealed while the float is buoyant within the liquid sulfur in the first chamber; and
wherein the liquid sulfur and the gas are prevented from entering the second chamber when the float assembly and the divider are sealed while the float lacks buoyancy in the liquid sulfur.

9. An apparatus, comprising:
a first chamber for receiving a liquid sulfur and a gas mixture;
a second chamber located at least partially above the first chamber;
a divider for separating the first chamber from the second chamber;
an outlet channel, wherein the outlet channel is operatively coupled to the divider;
a float assembly comprising a float and a plug, wherein the float assembly is located at least partially within the first chamber and is operatively coupled to the divider to seal and unseal the first chamber from the second chamber;
wherein an inlet opening of the outlet channel is submerged within the liquid sulfur;
wherein the liquid sulfur is allowed to flow upwardly from the first chamber to the outlet channel and into the second chamber and the gas remains in the first chamber when the float assembly and the divider are unsealed while the float is buoyant within the liquid sulfur; and
wherein the liquid sulfur and the gas are prevented from entering the second chamber when the float assembly and the divider are sealed while the float lacks buoyancy in the liquid sulfur.

* * * * *